(12) United States Patent
Teraoka et al.

(10) Patent No.: US 8,456,769 B2
(45) Date of Patent: Jun. 4, 2013

(54) LENS UNIT AND VEHICLE-MOUNTED INFRARED LENS UNIT

(75) Inventors: Kanji Teraoka, Osaka (JP); Akihito Fujii, Osaka (JP); Tatsuya Izumi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 3 days.

(21) Appl. No.: 13/131,812

(22) PCT Filed: Nov. 26, 2009

(86) PCT No.: PCT/JP2009/006385
§ 371 (c)(1),
(2), (4) Date: Aug. 15, 2011

(87) PCT Pub. No.: WO2010/061604
PCT Pub. Date: Jun. 3, 2010

(65) Prior Publication Data
US 2012/0019905 A1    Jan. 26, 2012

(30) Foreign Application Priority Data

Nov. 28, 2008 (JP) .................................. 2008-304896
Jul. 8, 2009 (JP) .................................. 2009-162083

(51) Int. Cl.
*G02B 7/02* (2006.01)
(52) U.S. Cl.
USPC .............................. 359/820; 359/822; 359/819
(58) Field of Classification Search
USPC .................. 359/694–704, 811–830, 353, 356
See application file for complete search history.

(56) References Cited

U.S. PATENT DOCUMENTS

2006/0245089 A1* 11/2006 Lee ................................ 359/826
2007/0098400 A1* 5/2007 Chen ............................. 396/529
2011/0205644 A1* 8/2011 Kojima ......................... 359/820

FOREIGN PATENT DOCUMENTS

| JP | 57-208518 | 12/1982 |
| JP | 07-140367 | 6/1995 |
| JP | 2001-084352 | 3/2001 |
| JP | 2002-014269 | 1/2002 |
| JP | 2007-052096 | 3/2007 |
| JP | 2007-121612 | 5/2007 |
| JP | 2008-287121 | 11/2008 |

* cited by examiner

*Primary Examiner* — Mohammed Hasan
(74) *Attorney, Agent, or Firm* — McDermott Will & Emery LLP

(57) ABSTRACT

Provided are a lens unit and a vehicle-mounted infrared lens unit capable of correcting a focal shift due to a temperature change without increasing the apparatus size, complicating a production process, and increasing the costs. In a vehicle-mounted infrared lens unit 4 configured such that a plurality of infrared lenses are held by a barrel 30 and a spacer 40 is interposed between two infrared lenses, a first infrared lens 10 is held sandwiched between the spacer 40 and a lens holding portion 31 of the barrel 30. The spacer 40 and the barrel 30 are formed of materials having different thermal expansion coefficients. An O-ring 60 is interposed between a lock portion 32 of the lens holding portion 31 and the first infrared lens 10. Thermal expansion of the spacer 40 allows the first infrared lens 10 to move in the axial direction against the elastic force of the O-ring 60. When the spacer 40 is shrunken, the elastic force of the O-ring 60 allows the first infrared lens 10 to move in the opposite direction.

13 Claims, 19 Drawing Sheets

| COMPONENT | MATERIAL | COEFFICIENT OF LINEAR EXPANSION |
|---|---|---|
| BARREL, LENS RETAINER | ALUMINUM (Al) | $\alpha 1 = 23.6 \times 10^{-6}$ |
| LENS | ZINC SULFIDE (ZnS) | $\alpha 2 = 6.7 \times 10^{-6}$ |
| SPACER | ACETAL RESIN (POM) | $\alpha 3 = 100 \times 10^{-6}$ |

OPTICAL CHARACTERISTIC (MTF) - TEMPERATURE

|  | -40 | -10 | 20 | 55 | 85 |
|---|---|---|---|---|---|
| WITH TEMPERATURE COMPENSATION | 0.598 | 0.61 | 0.614 | 0.609 | 0.597 |
| WITHOUT TEMPERATURE COMPENSATION | 0.321 | 0.523 | 0.614 | 0.534 | 0.358 |

OPTICAL CHARACTERISTIC (MTF) - TEMPERATURE

|  | -40 | -20 | 0 | 20 | 40 | 60 | 80 |
|---|---|---|---|---|---|---|---|
| WITH TEMPERATURE COMPENSATION | 0.6835 | 0.687 | 0.6855 | 0.6789 | 0.6675 | 0.6515 | 0.6311 |
| WITHOUT TEMPERATURE COMPENSATION | 0.0228 | 0.1028 | 0.2648 | 0.6789 | 0.4749 | 0.0589 | 0.0108 |

OPTICAL CHARACTERISTIC (MTF) - TEMPERATURE

|  | -40 | -20 | 0 | 20 | 40 | 60 | 80 |
|---|---|---|---|---|---|---|---|
| WITH TEMPERATURE COMPENSATION | 0.5318 | 0.5432 | 0.5491 | 0.5503 | 0.5477 | 0.5421 | 0.5341 |
| WITHOUT TEMPERATURE COMPENSATION | 0.3611 | 0.4605 | 0.5266 | 0.5503 | 0.531 | 0.4755 | 0.3963 |

OPTICAL CHARACTERISTIC (MTF) - TEMPERATURE

|  | -40 | -20 | 0 | 20 | 40 | 60 | 80 |
|---|---|---|---|---|---|---|---|
| WITH TEMPERATURE COMPENSATION | 0.5351 | 0.5319 | 0.5253 | 0.5157 | 0.5036 | 0.4896 | 0.4741 |
| WITHOUT TEMPERATURE COMPENSATION | 0.4746 | 0.5214 | 0.535 | 0.5157 | 0.4683 | 0.4012 | 0.3245 |

OPTICAL CHARACTERISTIC (MTF) - TEMPERATURE

|  | -40 | -20 | 0 | 20 | 40 | 60 | 80 |
|---|---|---|---|---|---|---|---|
| WITH TEMPERATURE COMPENSATION | 0.6547 | 0.6633 | 0.6695 | 0.6735 | 0.6754 | 0.6754 | 0.6737 |
| WITHOUT TEMPERATURE COMPENSATION | 0.4915 | 0.5794 | 0.6422 | 0.6735 | 0.6701 | 0.6327 | 0.5656 |

OPTICAL CHARACTERISTIC (MTF) - TEMPERATURE

|  | -40 | -20 | 0 | 20 | 40 | 60 | 80 |
|---|---|---|---|---|---|---|---|
| WITH TEMPERATURE COMPENSATION | 0.5575 | 0.5603 | 0.559 | 0.55361 | 0.5439 | 0.53 | 0.5116 |
| WITHOUT TEMPERATURE COMPENSATION | 0.0774 | 0.0265 | 0.156 | 0.5536 | 0.4306 | 0.008 | 0.0929 |

LENS UNIT AND VEHICLE-MOUNTED INFRARED LENS UNIT

RELATED APPLICATIONS

This application is the U.S. National Phase under 35 U.S.C. §371 of International Application No. PCT/JP2009/006385, filed on Nov. 26, 2009, which in turn claims the benefit of Japanese Application Nos. 2008-304896, filed on Nov. 28, 2008 and 2009-162083, filed on Jul. 8, 2009, the disclosures of which Applications are incorporated by reference herein.

TECHNICAL FIELD

The present invention relates to a lens unit configured such that one or more lenses are held in a barrel, and also relates to a vehicle-mounted infrared lens unit included, for example, in an infrared camera mounted on a vehicle for night time imaging.

BACKGROUND ART

In recent years, infrared imaging devices receiving infrared light for imaging have been widely used. For example, a night vision system is commercially practical, which includes an infrared imaging apparatus mounted on a vehicle for capturing images of the surroundings of the vehicle during the night, and when detecting a pedestrian who may collide with the vehicle, issues a warning to the driver. In order to capture an image, the infrared imaging apparatus includes an infrared lens passing and collecting infrared light and an infrared image pickup device receiving the infrared light.

In such an imaging apparatus, in order to facilitate production or assembly, one or more lenses for imaging are held in a cylindrical barrel to form a unit. FIG. 27 shows a schematic view showing a configuration of a conventional vehicle-mounted infrared lens unit 104. Vehicle-mounted infrared lens unit 104 includes a cylindrical barrel 130 in which a first infrared lens 110 and a second infrared lens 120 are held inside. Infrared lens unit 104 is configured such that first infrared lens 110, a spacer 140, and second infrared lens 120 are inserted in order in barrel 130 and are fixed by a lens retainer 150 in a state in which they are fitted in the inside of barrel 130. In the following, the second infrared lens 120 side in the axial direction is referred to as the front side, and the first infrared lens 110 side is referred to as the rear side.

Barrel 130 is provided with a lens holding portion 131 formed like a step around the inner circumferential surface on the rear side. First infrared lens 110 inserted in barrel 130 is fitted in the inside of lens holding portion 131 and thus hold. Spacer 140 is shaped like a cylinder having an outer diameter approximately equal to the inner diameter of barrel 130 and is inserted and fitted in the inside of barrel 130. Second infrared lens 120 has an outer diameter approximately equal to the inner diameter of barrel 130 and is inserted and fitted in the inside of barrel 130 in the vicinity of the front-side end thereof. First infrared lens 110 and second infrared lens 120 inserted and fitted in barrel 130 are fixed to barrel 130 using adhesive or the like after being subjected to positional adjustment (alignment) of the optical axis.

In barrel 130, the end surface of the rear side of spacer 140 is in abutment with a peripheral portion of the front side of first infrared lens 110, and the end surface of the front side of spacer 140 is in abutment with a peripheral portion of the rear side of second infrared lens 120. In other words, spacer 140 is a member sandwiched between first infrared lens 110 and second infrared lens 120 in barrel 130 for positioning those infrared lenses with respect to the axial direction. The distance L1 between those infrared lenses is defined by the axial length of spacer 140.

Since the temperature in the surrounding environment around the infrared imaging apparatus mounted on a vehicle varies widely, a change in optical characteristics of vehicle-mounted infrared lens unit 104 due to a temperature change becomes a problem. For example, when the refractive indexes of first infrared lens 110 and second infrared lens 120 of vehicle-mounted infrared lens unit 104 are varied with a temperature change, a focal shift with respect to the image pickup device occurs. As a result, for example, an image captured by the image pickup device is blurred, and the performance of the infrared imaging apparatus is degraded. A technique for avoiding this problem is sought.

Patent Document 1 proposes an optical apparatus including a substrate on which a functional element such as a CCD (Charge Coupled Device) is attached, a tubular holder having one end fixed to the substrate, and a tubular barrel having one end attached to a lens, wherein the barrel is arranged along a direction approximately vertical to the light-receiving surface of the functional element, and the other end of the barrel is attached to the other end of the holder. In this optical apparatus, even when the temperature of the environment during use changes and the holder is thermally expanded/shrunken with respect to the substrate, the barrel is thermally expanded/shrunken in the direction opposite to that of the thermal expansion/shrinkage of the holder, thereby preventing a focal shift of the lens.

Patent Document 2 proposes an image scanning apparatus including a carriage capable of reciprocating parallel to a platen on which a document is placed, wherein an imaging position can be maintained on a line sensor surface of the carriage even when the usage environment changes. In the carriage of this image scanning apparatus, a chip member for fixing a lens barrel and a housing accommodating the lens barrel has one end adhered to the lens barrel by adhesive and has the other end fixed to the housing by a screw. The thermal expansion coefficient of the chip member is set greater than the thermal expansion coefficient of the housing, so that the optical path length from the document to the collective lens and the optical path length from the collective lens to the line sensor can be changed even when the housing is thermally expanded or thermally shrunken due to a temperature change of the usage environment. The imaging position can thus be maintained.

PRIOR ART DOCUMENTS

Patent Documents

Patent Document 1: Japanese Patent Laying-Open No. 2002-14269
Patent Document 2: Japanese Patent Laying-Open No. 2001-84352

SUMMARY OF THE INVENTION

Problems to be Solved by the Invention

However, the optical apparatus disclosed in Patent Document 1 is configured such that the barrel having one end attached to the lens is inserted into the holder and the other end of the barrel is attached to the holder. Therefore, the apparatus size in the axial direction is large. A vehicle-mounted infrared imaging apparatus has to be reduced in size because the installation space in a vehicle is limited. On the other hand, in the optical apparatus in Patent Document 1, the shapes and thermal expansion coefficients of the barrel and the holder accommodating the barrel have to be set as appropriate. However, in the case where the shape and material of the holder is determined by the factors such as the appearance and strength of the apparatus, the appropriate shape and thermal expansion coefficient has to be set as appropriate only by changing the barrel. Therefore, the design is not easy.

The image scanning apparatus disclosed in Patent Document 2 is configured such that the tip member sandwiched between the barrel and the housing is used for positional adjustment in accordance with a temperature change, so that the thermal expansion coefficient of the chip member can be set as appropriate even when the material of the housing is predetermined. However, a screw hole for fixing the tip member and a through hole for adhesively fixing the chip member to the barrel have to be formed in the housing, which requires a large modification to the shape of the housing. In addition, the increased number of components including the chip member and the screw may lead to a complicated process and a cost increase.

The present invention is made in view of the situations as described above. An object of the invention is to provide a lens unit and a vehicle-mounted infrared lens unit capable of correcting a focal shift due to a temperature change, without a size increase of the apparatus, a complicated production process, and a cost increase.

Means for Solving the Problems

A lens unit in accordance with the present invention includes a plurality of lenses, a barrel for holding the lenses inside, and a spacer interposed between the two lenses in the barrel. The barrel or the spacer has a lens holding portion for holding the lens. The barrel and the spacer are formed of materials having different thermal expansion coefficients. The spacer is formed so as to increase a distance between the two lenses by thermal expansion. The lens holding portion is formed so as to allow the held lens to move in an axial direction by thermal expansion of the spacer.

In the lens unit in accordance with the present invention, the lens holding portion is provided in the barrel and is formed to hold the lens such that the lens is sandwiched between the lens holding portion and the spacer in the axial direction. The spacer is formed so as to press the lens held in the lens holding portion toward the lens holding portion by thermal expansion. The lens holding portion is formed so as to allow the held lens to move in the axial direction by pressing of the spacer.

In the lens unit in accordance with the present invention, the lens holding portion has a lock portion projected on an inner circumferential surface of the barrel for locking movement of the lens and an elastic member interposed between the lock portion and the lens.

In the lens unit in accordance with the present invention, the lens is formed to be tapered such that a peripheral portion thereof on one side in the axial direction has a diameter increasing toward the other side. The lens holding portion has an abutment portion projected on an inner circumferential surface of the barrel to abut on the peripheral portion on one side of the lens. The abutment portion is formed to be tapered at an angle corresponding to that of the peripheral portion of the lens.

In the lens unit in accordance with the present invention, an outside fitting portion fitted on an outside of the lens is formed at an end portion of the spacer.

In the lens unit in accordance with the present invention, the lens holding portion has an outside fitting portion provided at an end portion of the spacer to be fitted on an outside of the lens and fixing means for fixing the lens to the outside fitting portion. The lens fixed to the outside fitting portion is moved in the axial direction by thermal expansion of the spacer.

The lens unit in accordance with the present invention further includes lock means for locking movement of the spacer in the axial direction relative to the barrel. The spacer is formed so as to allow the lens held in the lens holding portion to move in the axial direction by thermal expansion of a portion from a lock position achieved by the lock means to the lens holding portion.

The lens unit in accordance with the present invention further includes a lens retainer fixed to the barrel and abutting on a lens arranged on an outermost side in the axial direction, for pushing down the lens to the spacer. An inner diameter of the barrel at the lock position achieved by the lock means is smaller than an outer diameter of the lens pushed by the lens retainer.

In the lens unit in accordance with the present invention, a plurality of spacers are arranged between the two lenses. The lens unit further includes a coupling member arranged between two spacers so as to be fitted on an inside of one spacer to lock an end portion of the spacer and to be fitted on an outside of another spacer to lock an end portion of the spacer. A thermal expansion coefficient of the coupling member is smaller than a thermal expansion coefficient of the spacers.

In the lens unit in accordance with the present invention, a thermal expansion coefficient of the spacer is greater than a thermal expansion coefficient of the barrel.

A lens unit in accordance with the present invention includes a lens and a barrel for holding the lens inside. The lens is formed to be tapered such that a peripheral portion thereof on one side in an axial direction has a diameter increasing toward the other side. The lens unit further includes an abutment portion projected on an inner circumferential surface of the barrel to abut on the peripheral portion on one side of the lens, and a pressing member in abutment with a peripheral portion on the other side of the lens for pressing the lens toward the one side. The abutment portion is formed to be tapered at an angle corresponding to that of the peripheral portion of the lens.

In the lens unit in accordance with the present invention, a thermal expansion coefficient of the barrel is greater than a thermal expansion coefficient of the lens.

A vehicle-mounted infrared lens unit in accordance with the present invention is included in an infrared imaging apparatus mounted on a vehicle and includes a plurality of infrared lenses, a barrel for holding the infrared lenses inside, and a spacer interposed between the two infrared lenses in the barrel. The barrel or the spacer has a lens holding unit for holding the infrared lens. The barrel and the spacer are formed of materials having different thermal expansion coefficients. The spacer is formed so as to increase a distance between the two infrared lenses by thermal expansion. The lens holding portion is formed to allow the held infrared lens to move in an axial direction by thermal expansion of the spacer.

A vehicle-mounted infrared lens unit in accordance with the present invention is included in an infrared imaging apparatus mounted on a vehicle and includes an infrared lens and a barrel for holding the infrared lens inside. The infrared lens is formed to be tapered such that a peripheral portion thereof on one side in an axial direction has a diameter increasing toward the other side. The lens unit further includes an abutment portion projected on an inner circumferential surface of the barrel to abut on the peripheral portion on one side of the infrared lens and a pressing member in abutment with a peripheral portion on the other side of the infrared lens for pressing the infrared lens toward the one side. The abutment portion is formed to be tapered at an angle corresponding to that of the peripheral portion of the infrared lens.

In the present invention, in a lens unit configured such that a plurality of lenses are held in a barrel and a spacer is interposed between the lenses for positioning in the axial direction, the barrel and the spacer are formed of materials having different thermal expansion coefficients. A lens holding unit for holding a lens is provided in the barrel or the spacer of the lens unit.

In this configuration, the spacer interposed between the lenses can increase the distance between the lenses by thermal expansion. The lens holding unit is configured to hold a lens such that the lens can be moved in the axial direction by thermal expansion of the spacer.

Therefore, when the temperature of the surrounding environment rises, the spacer of the lens unit is thermally expanded so as to increase the distance between the lenses, and, in response, the lens held in the lens holding portion can be moved in the axial direction. That is, the lens can be moved in the barrel in response to a temperature change, and the position of the lens can be moved, for example, relative to an image pickup device. The thermal expansion coefficients of the barrel, the spacer, and the like can be set as appropriate, so that the lens in the barrel can be moved corresponding to the shift amount of a focal shift caused by a temperature change, thereby cancelling and correcting the focal shift.

In the present invention, a lens holding portion for holding a lens is provided in the barrel of the lens unit such that the lens is sandwiched between the lens holding portion and the spacer.

In this configuration, the spacer is formed of a material having an appropriate thermal expansion coefficient such that the lens held sandwiched between the spacer and the lens holding portion is pressed toward the lens holding portion by thermal expansion. The lens holding portion is configured to hold the lens such that the lens can be moved in the axial direction by pressing of the spacer.

Therefore, when the temperature of the surrounding environment rises, the spacer of the lens unit is thermally expanded to press the lens toward the lens holding portion, and, in response, the lens held in the lens holding portion can be moved in the axial direction. That is, the lens can be moved in the barrel in response to a temperature change, and the position of the lens can be moved, for example, relative to an image pickup device. The thermal expansion coefficients of the barrel, the spacer, and the like are set as appropriate, so that the lens in the barrel can be moved corresponding to the shift amount of a focal shift caused by a temperature change, thereby cancelling and correcting the focal shift.

In the present invention, the lens holding portion has a lock portion projected on the inner circumferential surface of the barrel for locking the movement of the lens and a biasing member such as a spring or rubber. The biasing member is interposed between the lock portion and the lens to bias the lens toward the spacer.

Therefore, the lens holding portion can hold the lens such that the lens can be moved in the axial direction. When the temperature of the surrounding environment drops, the spacer of the lens unit is shrunken. In this case, the biasing member biases the lens toward the spacer, so that the lens can be moved to the direction opposite to that when the spacer is thermally expanded. Therefore, the thermal expansion coefficients of the barrel, the spacer, and the like are set as appropriate, so that a focal shift caused, for example, by a change in refractive index of the lens due to a temperature change can be cancelled by the positional change of the lens in the barrel and thus be corrected.

In the present invention, the peripheral portion of one side of the lens held in the lens holding portion is formed to be tapered such that the diameter increases toward the other side. The lens holding portion has an abutment portion projected on the inner circumferential surface of the barrel to abut on the peripheral portion of the lens. This abutment portion is formed to be tapered at an angle corresponding to the angle of the peripheral portion of the lens.

In this configuration, when the barrel is expanded or shrunken with a temperature change, and the inner diameter of the barrel is increased or reduced, the lens held in the lens holding portion can be moved along the inclination of the tapered abutment portion. For example, if the abutment portion of the lens holding portion is formed to be tapered such that the diameter increases from one side of the barrel to the other side, when the inner diameter of the barrel is increased by thermal expansion, the lens can be moved toward the one side (that is, the smaller inner diameter side) of the barrel in the axial direction. In this case, the spacer presses the lens from the other side to the one side of the barrel to cause the lens to move toward the one side. On the other hand, when the inner diameter of the barrel is reduced because of shrinkage, the lens is moved toward the other side (that is, the larger inner diameter side) of the barrel in the axial direction.

Therefore, when the temperature of the surrounding environment drops, the spacer of the lens unit is shrunken, and in this case, the barrel is also shrunken and the inner diameter thereof is reduced. Thus, the tapered shape of the lens and the lens holding portion allows the lens to move toward the spacer. The thermal expansion coefficients of the barrel, the spacer, and the like are set as appropriate, so that a focal shift caused by a change in refractive index of the lens due to a temperature change can be cancelled by the positional change of the lens in the barrel and thus be corrected.

In the present invention, an outside fitting portion fitted on the outside of the lens is formed at an end portion (one end or opposite ends) of the spacer. Accordingly, the assembly of the lens unit can be carried out by fitting the spacer on the outside of the lens and thereafter inserting the spacer and the lens into the barrel. This facilitates the assembly of the lens unit.

When the outside fitting portions are formed on opposite ends of the spacer, two lenses are fitted in the spacer, and the two lenses are thereafter aligned and then fixed to the spacer using adhesive or the like. The assembly of the lens unit can be carried out by inserting the spacer having the lenses fixed thereto into the barrel. This eliminates the need for performing alignment of the two lenses later and further facilitates the assembly of the lens unit.

In the present invention, a lens holding portion fitted on the outside of the lens for holding the lens is provided at an end portion of the spacer of the lens unit. The lens is fixed to the spacer by fixing means such as adhesive or a screw.

Accordingly, when the temperature of the surrounding environment rises, the spacer of the lens unit is thermally expanded, so that the position of the lens held at the end portion of the spacer is moved. That is, the lens can be moved in the barrel in response to a temperature change, and the position of the lens can be moved, for example, relative to an image pickup device. The thermal expansion coefficient of the spacer is set as appropriate, so that the lens in the barrel can be moved corresponding to the shift amount of a focal shift caused by a temperature change, thereby cancelling and collecting the focal shift.

In the present invention, the spacer of the lens unit is inserted in the axial direction in the barrel during assembly. The spacer and the barrel are provided with lock means for locking the movement of the spacer in the axial direction, thereby preventing the spacer inserted in the barrel from moving from a prescribed position.

In this configuration, the lock position achieved by the lock means in the spacer is not moved by thermal expansion, and the thermal expansion at a portion from the lock position to the lens holding portion allows the lens to move in the axial direction. Therefore, the portion from the lock position to the lens holding portion and the thermal expansion coefficient of the spacer are set as appropriate, so that the lens at the lens holding portion can be moved more reliably by thermal expansion of the spacer.

In the present invention, the lens unit includes a lens retainer in abutment with a lens arranged on the outermost end of a plurality of lenses for pushing down the lens toward the spacer thereby fixing the lens. This facilitates the fixing of the lens.

In this configuration, when the lens is pushed down by the lens retainer, the spacer provided between the lenses may be deformed, for example, in a high temperature environment. Then, in the present invention, the inner diameter of the barrel at the lock position where the movement of the spacer is locked is set smaller than the outer diameter of the lens retained by the lens retainer. Accordingly, the axial force applied to the lens by the lens retainer is applied not only to the spacer but to the barrel, thereby preventing deformation of the spacer.

In the present invention, a plurality of spacers are arranged between two lenses, and a coupling member is arranged between the spacers. The coupling member is fitted on the inside of one spacer to lock the end portion thereof and is fitted on the outside of another spacer to lock the end portion thereof. The coupling member is formed of a material having a thermal expansion efficient smaller than that of these spacers. Accordingly, the freedom of degree concerning the setting of distance between two lenses increased by thermal expansion of the spacer can be improved. A plurality of spacers may have respective different thermal expansion coefficients or may have the identical thermal expansion coefficient.

In the present invention, the materials of the spacer and the barrel are determined such that the thermal expansion coefficient of the spacer is greater than the thermal expansion coefficient of the barrel. Accordingly, when the temperature of the surrounding environment rises, the spacer is expanded more than the barrel, so that the lens held sandwiched between the lens holding portion provided in the barrel and the spacer can be pressed by the spacer toward the lens holding portion.

In the present invention, in a lens unit configured such that one or more lenses are held by a barrel, the peripheral portion of one side in the axial direction of the lens is formed to be tapered such that the diameter increases toward the other side. The barrel has an abutment portion projected from the internal circumference thereof to abut on the peripheral portion of the lens. The abutment portion is formed to be tapered at an angle corresponding to that of the peripheral portion of the lens. The lens unit holds the lens by the barrel and further includes a pressing member in abutment with the peripheral portion on the other side of the lens to press the lens toward one side when the tapered portion of the lens and the tapered portion of the abutment portion come into abutment with each other.

In this configuration, when the barrel is expanded or shrunken with a temperature change and the inner diameter of the barrel is increased or reduced, the lens held in the barrel can move along the inclination of the tapered abutment portion. For example, if the tapered portion of the barrel has a diameter increasing from one side of the barrel toward the other side, when the inner diameter of the barrel is increased by thermal expansion, the lens can be moved toward one side (that is, the smaller inner diameter side) of the barrel in the axial direction. In this case, the pressing member presses the lens from the other side to one side of the barrel to cause the lens to move to the one side. On the other hand, when the inner diameter of the barrel is reduced because of shrinkage, the lens is moved toward the other side (that is, the larger inner diameter side) of the barrel in the axial direction.

Accordingly, the lens in the barrel can be moved in the axial direction in response to a temperature change of the surrounding environment, so that a focal shift caused, for example, by a change in refractive index of the lens due to a temperature change can be cancelled by the positional change of the lens in the barrel and thus be corrected.

In the present invention, in the lens unit configured as described above such that the tapered portions formed in the lens and the barrel allow the lens to move in the axial direction, the materials of the barrel and the lens are determined such that the thermal expansion coefficient of the barrel is greater than the thermal expansion coefficient of the lens. Accordingly, the lens can be moved relative to the barrel in the axial direction in response to a temperature change of the surrounding environment.

Effects of the Invention

According to the present invention, the characteristics of components of the lens unit being expanded or reduced with a temperature change of the surrounding environment are utilized to move the lens of the lens unit in the axial direction in the barrel in response to a temperature change, so that the focal shift of the lens unit caused by such factors as a change in refractive index of the lens due to a temperature change can be cancelled and corrected. As compared with the conventional lens unit, the configuration of the lens unit in the present invention can be realized with little modifications to the shapes of the components, and/or with addition of a component such as a biasing member or pressing member that is realized by an existing small part such as a spring, and does not incur a size increase of the lens unit, complication of the production process, a cost increase, and the like.

Figure 1:
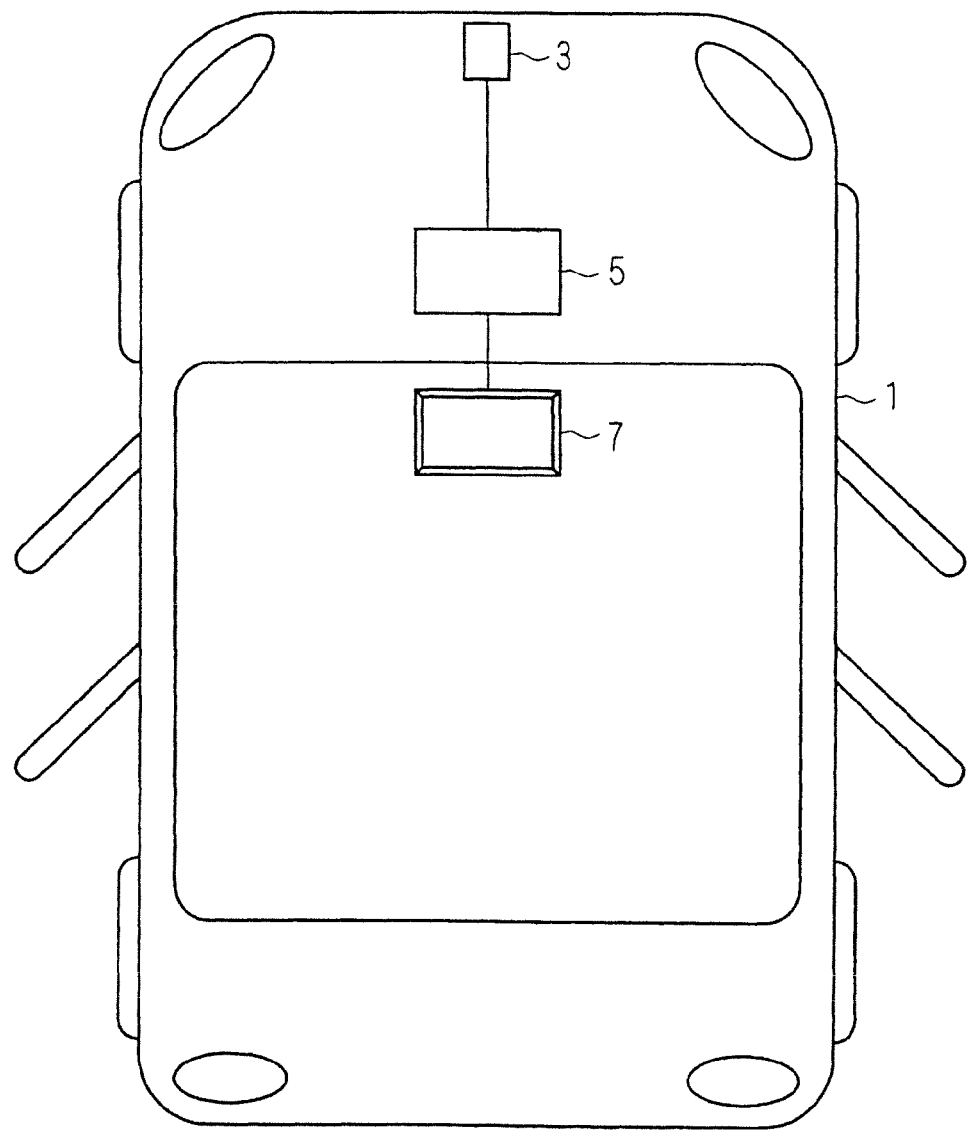
FIG. 1 is a diagram showing an exemplary vehicle on which an infrared imaging apparatus is mounted.

DESCRIPTION OF THE REFERENCE SIGNS 1 vehicle
3 infrared imaging apparatus
3a image pickup device
3d protrusion portion
4, 4a, 4b, 4c vehicle-mounted infrared lens unit
10 first infrared lens
11 step portion
20, 20a second infrared lens
21 step portion
30, 30a, 30b, 30c barrel
31, 31c lens holding portion
32, 32c lock portion
33 step portion
34, 34c step portion
40, 40c spacer
41 first outside fitting portion
42 second outside fitting portion
43 step portion
43c flange portion
50, 50a lens retainer
60 O-ring
60a waved washer
65, 66 seal member
204, 204a vehicle-mounted infrared lens unit
210 first infrared lens
211 tapered surface
220 second infrared lens
230, 230a barrel
231 lens holding portion
232 abutment portion
233 tapered surface
240, 240a spacer
250 lens retainer
304 vehicle-mounted infrared lens unit
310 infrared lens
311 tapered surface 330 barrel
331 lens holding portion
332 abutment portion
333 tapered surface
350 lens retainer
370 spring member
404, 404a vehicle-mounted infrared lens unit
430 barrel
440, 440a first spacer
441 first outside fitting portion
442 second outside fitting portion
443 step portion
445a second spacer
447 second spacer
447a third spacer
470 spacer joint
470a first spacer joint
471 lock portion
472 lock portion
475a second spacer joint
476 lock portion
477 lock portion
504, 504a, 504b, 504c vehicle-mounted infrared lens unit
510a first infrared lens
511a step portion
515 screw member
530, 530b barrel
534b step portion
540b spacer
541b outside fitting portion
543b flange portion
604 vehicle-mounted infrared lens unit
630 barrel
640 spacer

MODES FOR CARRYING OUT THE INVENTION

First Embodiment

In the following, the present invention will be specifically described based on the drawings showing the embodiments thereof. FIG. 1 is a diagram showing an exemplary vehicle on which an infrared imaging apparatus is mounted. The figure shows a vehicle 1, in which an infrared imaging apparatus 3 is mounted at a front portion of a body of vehicle 1 (for example, in the vicinity of a front bumper). Infrared imaging apparatus 3 can receive infrared light to pick up an image and outputs an image obtained by picking up an image to an ECU (Electronic Control Unit) 5 mounted on vehicle 1.

ECU 5 is mounted at an appropriate place of vehicle 1, performs a variety of image processing on the image input from infrared imaging apparatus 3, and performs processing for displaying the image on a display 7. Display 7 is mounted in the vicinity of the driver's seat of vehicle 1 and displays an image input from ECU 5. ECU 5 may perform processing of detecting a pedestrian from the image picked up by infrared imaging apparatus 3 and allows image display on display 7 only when a pedestrian is detected. Because of the installation of infrared imaging apparatus 3 on vehicle 1, the driver can be notified of the approach of a pedestrian during the night, thereby improving the running safety of vehicle 1.

Figure 2:
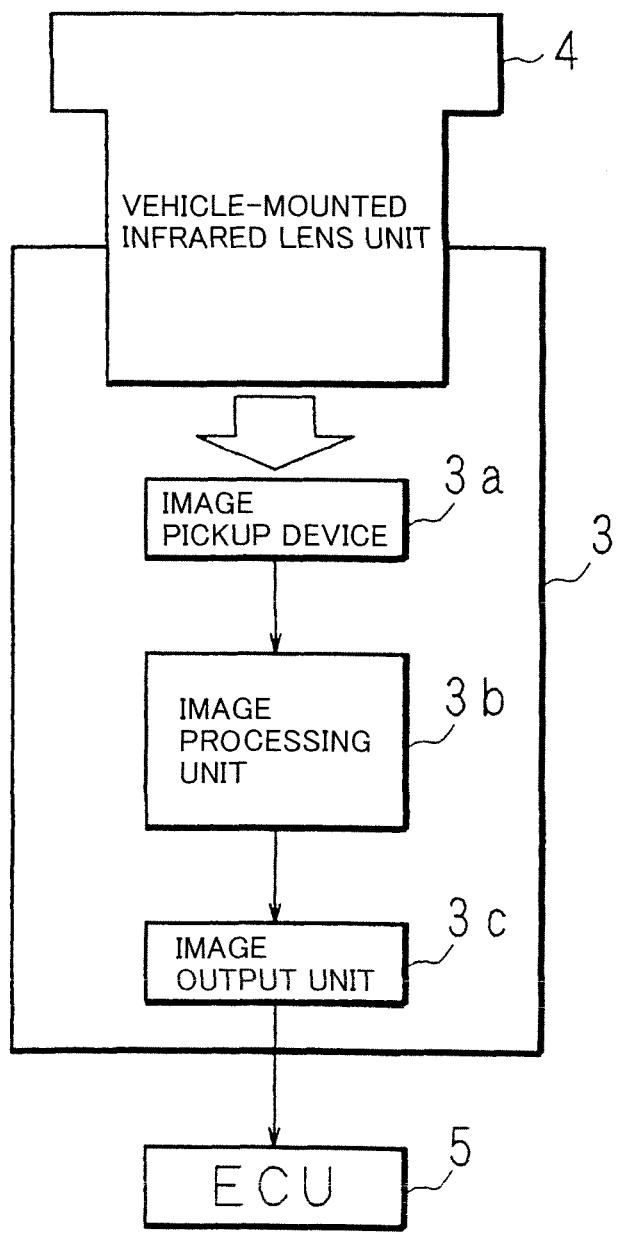
FIG. 2 is a block diagram showing a configuration of the infrared imaging apparatus.

FIG. 2 is a block diagram showing a configuration of infrared imaging apparatus 3. Infrared imaging apparatus 3 includes a vehicle-mounted infrared lens unit 4 in which one or more infrared lenses collecting infrared light and a cylindrical barrel are integrated, and an image pickup device 3a receiving infrared light collected by vehicle-mounted infrared lens unit 4 for picking up an image. The image picked up by image pickup device 3a is applied to an image processing unit 3b. Image processing unit 3b performs image processing such as correction processing on the image picked up by image pickup device 3a and outputs the processed image to an image output unit 3c. Image output unit 3c is connected to ECU 5 of vehicle 1 through a communication cable or the like, converts the image input from image processing unit 3b into data or a signal suitable for communication, and outputs the data or signal to ECU 5.

Figure 3:
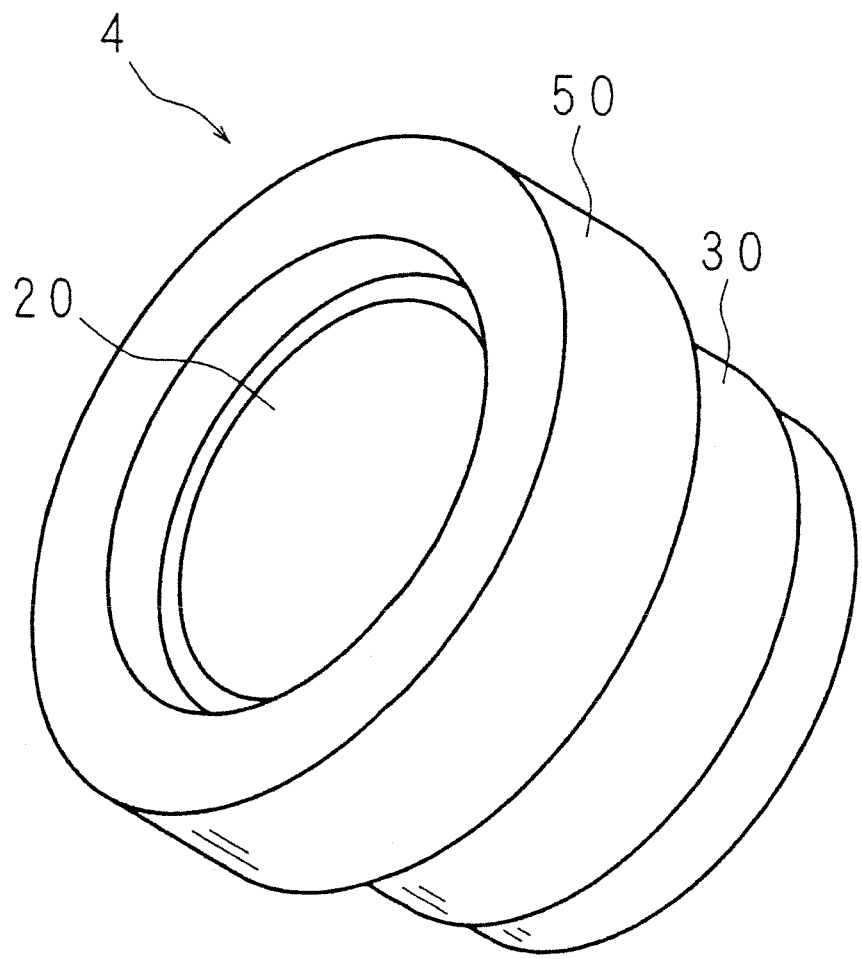
FIG. 3 is an external perspective view of a vehicle-mounted infrared lens unit in accordance with a first embodiment of the present invention.
Figure 4:
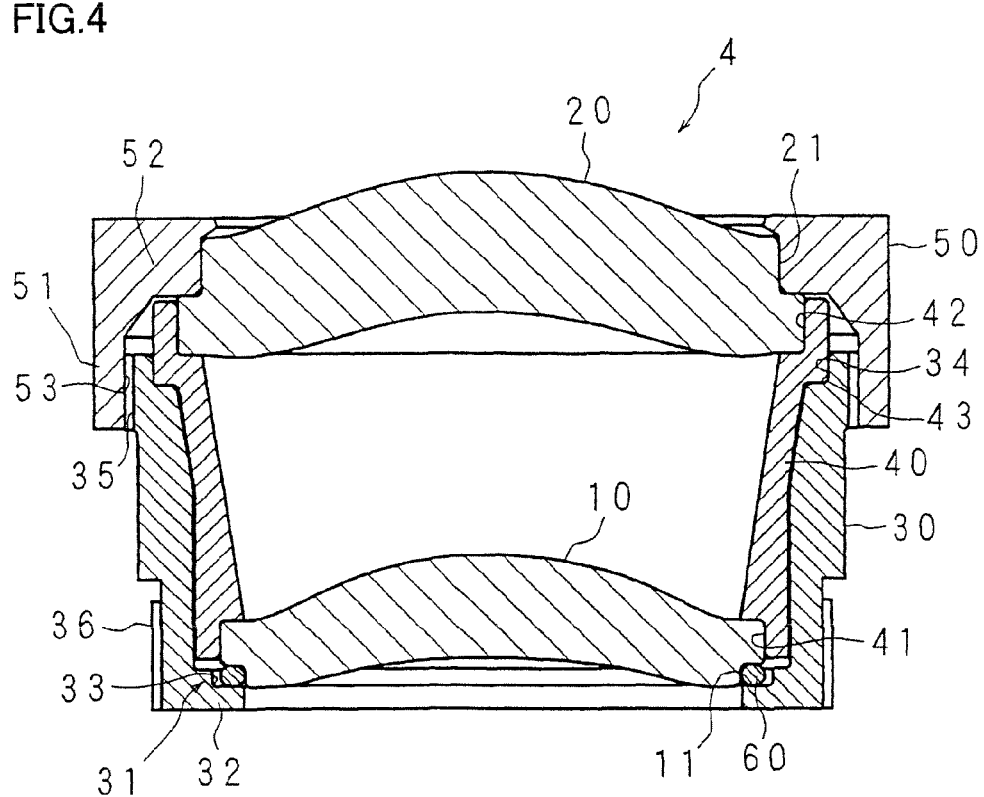
FIG. 4 is a schematic cross-sectional view showing a configuration of the vehicle-mounted infrared lens unit in accordance with the first embodiment of the present invention.

FIG. 3 is an external perspective view of vehicle-mounted infrared lens unit 4 in accordance with a first embodiment of the present invention, and FIG. 4 is a schematic cross-sectional view showing a configuration of vehicle-mounted infrared lens unit 4. Vehicle-mounted infrared lens unit 4 in accordance with the first embodiment includes two infrared lenses, namely, a first infrared lens 10 and a second infrared lens 20, a barrel 30 for holding them inside, a spacer 40 for positioning the two infrared lenses with respect to the axial direction, a lens retainer 50 fixed to barrel 30 for retaining the two infrared lenses and spacer 40, and an annular O-ring 60 formed of an elastic body such as rubber. Vehicle-mounted infrared lens unit 4 is configured such that O-ring 60, first infrared lens 10, spacer 40, and second infrared lens 20 are inserted in barrel 30 and retained by lens retainer 50 to be held in barrel 30. In the following, the second infrared lens 20 side (the upper side in FIG. 4) with respect to the axial direction of barrel 30 is referred to as the front side, and the first infrared lens 10 side (the lower side in FIG. 4) is referred to as the rear side.

First infrared lens 10 and second infrared lens 20 are produced using zinc sulfide (ZnS) as a material, pass infrared rays in a range of 8 μm to 12 μm, and do not pass most of light in other wavelengths (visible light and ultraviolet rays, etc.). First infrared lens 10, formed in the shape of a disk, is a lens, called a meniscus lens, having a convex surface on the front side and a concave surface on the rear side. First infrared lens 10 has a step portion 11 in which the outer circumferential surface is formed like a step in such a manner that the peripheral portion on the rear side is depressed around the entire circumference. With the provision of step portion 11, first infrared lens 10 has a large outer diameter on the front side and a small outer diameter on the rear side.

Step portion 11 of first infrared lens 10 is a portion that is formed in order to attach O-ring (elastic member) 60. O-ring 60 is produced using an elastic body such as rubber as a material and is an annular body having an approximately circular cross-sectional shape. The inner diameter of O-ring 60 is smaller than the outer diameter of the rear side of first infrared lens 10 where step portion 11 is formed. Therefore, O-ring 60 is expanded and fitted on the outside of step portion 11 of first infrared lens 10, so that O-ring 60 can be attached to first infrared lens 10. It is noted that the length (depth) of step portion 11 is slightly smaller than the thickness of O-ring 60 with respect to the axial direction of first infrared lens 10.

Second infrared lens 20, similar to first infrared lens 10, formed in the shape of a disk, is a meniscus lens having a convex surface on the front side and having a concave surface on the rear side. Second infrared lens 20 has a step portion 21 in which the outer circumferential surface is formed like a step in such a manner that the peripheral portion on the front side is depressed around the entire circumference. With the provision of step portion 21, second infrared lens 20 has a large outer diameter on the front side and a small outer diameter on the rear side.

Spacer 40 is formed in the shape of a cylinder and is produced using POM (polyoxymethylene, acetal resin) as a material. Spacer 40 has an outer diameter approximately equal to the inner diameter of barrel 30 and can be inserted into barrel 30 from the front side to be fitted on the inside of barrel 30. The inner circumferential surface of spacer 40 is formed to be tapered such that the inner diameter decreases from the front side to the rear side. At the rear-side end of spacer 40, a first outside fitting portion 41 is provided in which the inner circumferential surface is formed like a step in such a manner that the inner peripheral portion of spacer 40 is depressed around the entire circumference. With the provision of first outside fitting portion 41, the inner diameter of spacer 40 is stepwise increased in the vicinity of the rear-side end, and the inner diameter at the rear-side end of spacer 40 is approximately equal to the outer diameter of the front side of first infrared lens 10. Therefore, first outside fitting portion 41 of spacer 40 is fitted on the outside of the front side of first infrared lens 10 and is in abutment with the front-side peripheral portion and the outer circumferential surface of first infrared lens 10. It is noted that the length (depth) of first outside fitting portion 41 is approximately equal to the length (thickness) of the larger outer diameter portion on the front side of first infrared lens 10, with respect to the axial direction of spacer 40.

Similarly, at the front-side end of spacer 40, a second outside fitting portion 42 is provided in which the inner circumferential surface is formed like a step such that the inner peripheral portion of spacer 40 is depressed around the entire circumference. With the provision of second outside fitting portion 42, the inner diameter of spacer 40 is stepwise increased in the vicinity of the front-side end, and the inner diameter of the front-side end of spacer 40 is approximately equal to the outer diameter of the rear side of second infrared lens 20. Therefore, second outside fitting portion 42 of spacer 40 is fitted on the outside of the rear side of second infrared lens 20 and is in abutment with the rear-side peripheral portion and the outer circumferential surface of second infrared lens 20. It is noted that the length (depth) of second outside fitting portion 42 is approximately equal to the length (thickness) of the larger outer diameter portion on the rear side of second infrared lens 20, with respect to the axial direction of spacer 40.

The outer circumferential surface of spacer 40 is formed to have a constant outer diameter from the rear-side end to the central portion in the axial direction, is formed to be tapered such that the diameter increases from the central portion to the front side, and is formed like a step in the vicinity of the front-side end such that the outer diameter stepwise increases. A step portion 43 of the outer circumferential surface of spacer 40 is provided corresponding to second outside fitting portion 42 formed on the inner circumferential surface.

Barrel 30 is formed in the shape of a cylinder and is produced using aluminum as a material. The inner diameter of the barrel 30 is larger than the outer diameter (maximum diameter) of first infrared lens 10. At the rear-side end of barrel 30, a lens holding portion 31 is provided for holding first infrared lens 10 on the inner circumferential surface thereof. Lens holding portion 31 has an annular lock portion 32 projected on the inner circumferential surface of barrel 30 around the entire circumference. Lock portion 32 locks the movement of first infrared lens 10 toward the rear side. Lock portion 32 of lens holding portion 31, together with spacer 40 fitted on the inside of barrel 30, holds first infrared lens 10 such that first infrared lens 10 having O-ring 60 is sandwiched therebetween.

On the front side of lock portion 32, a step portion 33 is formed like a step such that the inner peripheral portion of lock portion 32 is depressed around the entire circumference. With the provision of step portion 33, the inner diameter of lock portion 32 of barrel 30 decreases stepwise. The inner diameter of the front side of lock portion 32 where step portion 33 is formed is slightly larger than the outer diameter of the front side of first infrared lens 10. The inner diameter of the rear side of lock portion 32 is larger than the inner diameter of the rear side of first infrared lens 10 and is smaller than the outer diameter of the front side of first infrared lens 10.

Thus, first infrared lens 10 is sandwiched between lens holding portion 31 and spacer 40 so as to be accommodated between step portion 33 of lock portion 32 and first outside fitting portion 41 of spacer 40. Here, first infrared lens 10 is not in direct contact with lock portion 32 of lens holding portion 31 but is in contact with lock portion 32 with O-ring 60, attached to step portion 11, being interposed. In other words, O-ring 60 is present between first infrared lens 10 and lock portion 32, and O-ring 60 biases first infrared lens 10 toward spacer 40 by elastic force. With the provision of O-ring 60 at lens holding portion 31, first infrared lens 10 can be slightly moved in the axial direction against the elastic force of O-ring 60.

The inner circumferential surface of barrel 30 has a shape corresponding to the outer circumferential surface of spacer 40. More specifically, the inner circumferential surface of barrel 30 is formed such that the inner diameter is constant from the portion where lens holding portion 31 is provided to the central portion in the axial direction, is formed to be tapered such that the diameter increases from the central portion toward the front side, and is formed like a step in the vicinity of the front-side end such that the inner diameter increases stepwise. A step portion 34 of the inner circumferential surface of barrel 30 is provided so as to be fitted on the outside of step portion 43 of spacer 40. Spacer 40 inserted from the front side of barrel 30 has step portion 43 coming into abutment with step portion 34 of barrel 30, whereby further insertion into barrel 30 is locked. In this state, a sufficient gap is provided between the rear-side end surface of spacer 40 and the front portion of lens holding portion 31 so that they are not in abutment with each other.

On the outer circumferential surface of barrel 30, thread groove portions 35, 36 are formed in the vicinity of the opposite ends on the front side and the rear side, respectively. Thread groove portion 35 formed at the front side of barrel 30 is to fix lens retainer 50 to barrel 30. Thread groove portion 36 formed at the rear side of barrel 30 is to fix vehicle-mounted infrared lens unit 4 to a housing (not shown) in which image pickup device 3*a*, image processing unit 3*b*, image output unit 3*c*, etc. of infrared imaging apparatus 3 are accommodated.

Lens retainer 50 is produced using the same material as barrel 30, aluminum, and has a cylindrical tube portion 51 having a thread groove portion 53 on the inner circumferential surface thereof and an annular retaining portion 52 provided at the front-side end of tube portion 51 around the inner circumferential surface. Thread groove portion 53 is screwed on thread groove portion 35 formed at the front-side end of barrel 30. Annular retaining portion 52 is fitted on the outside of the small outer diameter portion of second infrared lens 20 where step portion 21 is formed. Lens retainer 50 screwed from the front side of barrel 30 through a rotating operation is fitted on the outside of second infrared lens 20 held by barrel 30. Lens retainer 50 is further rotated to push down and press second infrared lens 20 toward the rear side thereby fixing first infrared lens 10, spacer 40, and second infrared lens 20 in barrel 30. It is noted that lens retainer 50 may be fixed to barrel 30, for example, using adhesive.

In assembly of vehicle-mounted infrared lens unit 4, first, first infrared lens 10 is fitted in first outside fitting portion 41 of spacer 40, and second infrared lens 20 is fitted in second outside fitting portion 42. An adjustment operation (alignment operation) is thus performed so that the optical axes of first infrared lens 10 and second infrared lens 20 are coincident. After the alignment operation is finished, first infrared lens 10 and second infrared lens 20 are adhesively fixed to spacer 40 using adhesive or the like. This prevents an axial shift of first infrared lens 10 and second infrared lens in the subsequent assembly operation.

Then, O-ring 60 is attached to step portion 11 of first infrared lens 10. The thus integrated O-ring 60, first infrared lens 10, spacer 40, and second infrared lens 20 are inserted and fitted in the barrel 30 from the front-side opening thereof until step portion 43 of spacer 40 comes into abutment with step portion 34 of barrel 30. Thereafter, lens retainer 50 is screwed on the front side of barrel 30 through a rotating operation, and lens retainer 50 is fixed to barrel 30 using adhesive or the like. The assembly of vehicle-mounted infrared lens unit 4 is thus completed.

In this manner, because of provision of first outside fitting portion 41 and second outside fitting portion 42 in spacer 40, after first infrared lens 10 and second infrared lens 20 undergo an alignment operation and are adhesively fixed to spacer 40, these integrated components can be inserted into barrel 30. Therefore, the alignment operation can be facilitated, and the insertion of the components into barrel 30 can be facilitated. Furthermore, because of the formation of step portion 11 in first infrared lens 10, O-ring 60 can be integrally inserted into barrel 30. Therefore, vehicle-mounted infrared lens unit 4 in accordance with the first embodiment is advantageous in that the assembly can be facilitated.

Figures 5, 6:
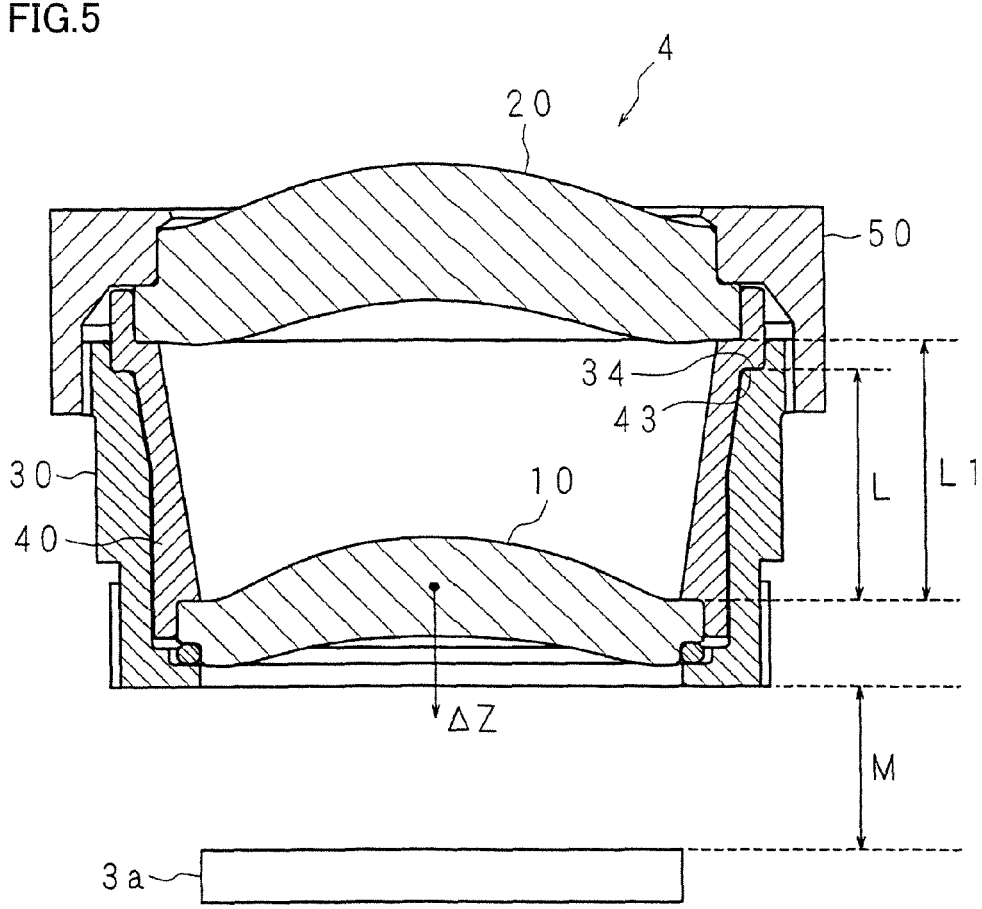
FIG. 5 is a diagram for illustrating a temperature compensation function of the vehicle-mounted infrared lens unit in accordance with the first embodiment of the present invention.
FIG. 6 is a diagram for illustrating a temperature compensation function of the vehicle-mounted infrared lens unit in accordance with the first embodiment of the present invention.
Figures 7A, 7B:
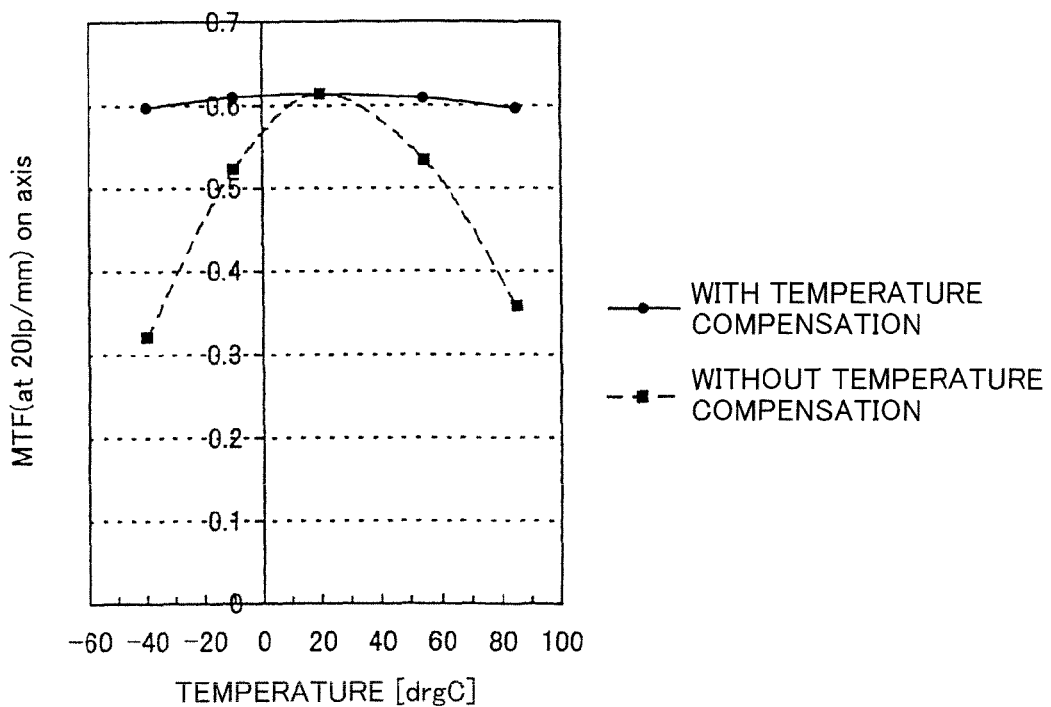
FIG. 7A is a diagram for illustrating a temperature compensation function of the vehicle-mounted infrared lens unit in accordance with the first embodiment of the present invention.
FIG. 7B is a diagram for illustrating a temperature compensation function of the vehicle-mounted infrared lens unit in accordance with the first embodiment of the present invention.
Figure 27:
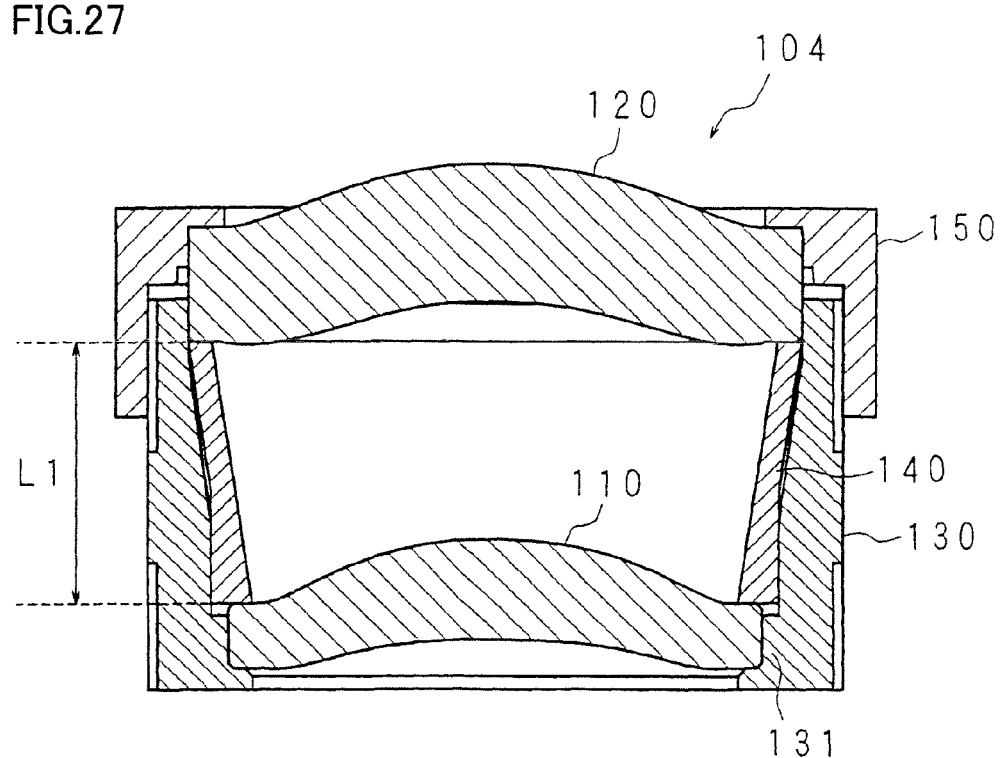
FIG. 27 is a schematic view showing a configuration of a conventional vehicle-mounted infrared lens unit.

FIG. 5, FIG. 6, FIG. 7A, and FIG. 7B are diagrams for illustrating the temperature compensation function of vehicle-mounted infrared lens unit 4 in accordance with the first embodiment of the present invention. FIG. 5 mainly shows the distance between the infrared lenses and the distance from image pickup device 3a in vehicle-mounted infrared lens unit 4. FIG. 6 shows the materials and coefficients of linear expansion of the components of vehicle-mounted infrared lens unit 4 in the form of a table. The changes of optical characteristics (MTF: Modulation Transfer Function) due to temperature changes in the conventional vehicle-mounted infrared lens unit 104 (see FIG. 27) and vehicle-mounted infrared lens unit 4 in accordance with the first embodiment were simulated, and the results are shown in FIG. 7A in the form of a table and in FIG. 7B in the form of a graph.

In the conventional vehicle-mounted infrared lens unit 104, the distance between first infrared lens 110 and second infrared lens 120 (that is, the length in the axial direction of spacer 140) is determined such that the value of MTP is the best at a temperature of 20° C. The distance is 9.013 mm. Barrel 130 and spacer 140 of the conventional vehicle-mounted infrared lens unit 104 are formed of aluminum having coefficient of linear expansion α1, and their axial lengths change as the temperature changes. Thus, the distance between the two infrared lenses also changes. In consideration of this change, MTF of the conventional vehicle-mounted infrared lens unit 104 was calculated through simulation for five cases with temperatures of −40° C., −10° C., 20° C., 55° C., and 85° C. The calculated values of MTF are shown as "without temperature compensation" in FIG. 7A and FIG. 7B.

It can be understood from the simulation results that the optical characteristics of the conventional vehicle-mounted infrared lens unit 104 are deteriorated when the temperature rises or drops. Based on this result, the amount of focal shift of vehicle-mounted infrared lens unit 104 is calculated, and the obtained result is about 40 μm when the temperature changes by 60° C. (when the temperature rises by 60° C., the focal point of vehicle-mounted infrared lens unit 104 is shifted by about 40 μm toward the front side (in the direction away from image pickup device 3a), and when the temperature drops by 60° C., it is shifted by about 40 μm in the opposite direction). In this respect, if first infrared lens 110 could be moved about 40 μm relative to image pickup device 3a when a temperature change of 60° C. occurs, the amount of focal shift of vehicle-mounted infrared lens unit 104 could be compensated for and corrected.

In vehicle-mounted infrared lens unit 4 in accordance with the first embodiment, step portions 11 and 21 are formed in first infrared lens 10 and second infrared lens 20, respectively. However, the difference in shape only lies in the peripheral portion, and the optical characteristics are approximately equal to those of first infrared lens 110 and second infrared lens 120 of the conventional vehicle-mounted infrared lens unit 104. Therefore, the distance L1 between first infrared lens 10 and second infrared lens 20 is set to be 9.013 mm identical to that of the conventional vehicle-mounted infrared lens unit 104, so that the value of MFP is the best at a temperature of 20°.

For example, when the temperature of the surrounding environment rises, each component of vehicle-mounted infrared lens unit 4 is thermally expanded. The insertion of spacer 40 toward the rear side of barrel 30 is locked because of the abutment between step portion 43 and step portion 34 of barrel 30. Therefore, if barrel 30 elongates in the axial direction due to thermal expansion, spacer 40 is moved toward the front side (that is, in the direction away from image pickup device 3a) with the positional change of step portion 34 of barrel 30. Spacer 40 elongates in the axial direction due to thermal expansion to move first infrared lens 10 toward the rear side (that is, in the direction closer to image pickup device 3a).

Therefore, if the expansion coefficient of spacer 40 is greater than the expansion coefficient of barrel 30, spacer 40 can press first infrared lens 10 against the elastic force of O-ring 60 with a temperature increase, causing first infrared lens 10 to move inside barrel 30 so as to approach image pickup device 3a. On the other hand, when the temperature drops, the pressing by spacer 40 disappears or weakens, so that the elastic force of O-ring 60 causes first infrared lens 10 to move in the direction away from image pickup device 3a.

Let L be the distance from the position where spacer 40 is locked at step portion 43 by step portion 34 of barrel 30 to the position where first outside fitting portion 41 is in abutment with the front surface of first infrared lens 10. The distance of movement of spacer 40 caused by expansion or shrinkage of barrel 30 with a temperature change ΔT can be approximated as L×α1×ΔT, where the coefficient of linear expansion of the barrel is α1. The amount of the changing length of spacer 40 with a temperature change ΔT can be approximated as L×α3×ΔT, where the coefficient of linear expansion of spacer 40 is α3. Therefore, a distance ΔZ of movement of first infrared lens 10 in the axial direction is expressed by the following equation (1).

$$\Delta Z = L \times (\alpha 3 - \alpha 1) \times \Delta T \tag{1}$$

In order to move first infrared lens 10 by about 40 μm relative to image pickup device 3a when a temperature change of 60° C. occurs, the materials and coefficients of linear expansion of the components were set as shown in FIG. 6, in vehicle-mounted infrared lens unit 4 in accordance with the first embodiment. The shapes of spacer 40 and barrel 30 were designed such that L=8.79 mm. Under these conditions, the distance of movement of first infrared lens 10 is such that ΔZ=40.3 μm, based on the equation (1) above. Thus, at a temperature change of 60° C., first infrared lens 10 can be moved by 40 μm relative to image pickup device 3a.

For vehicle-mounted infrared lens unit 4 in accordance with the first embodiment, the changes of MTF with temperature changes were simulated similarly to the conventional vehicle-mounted infrared lens unit 104, and the results are shown as "with temperature compensation" in FIG. 7A and FIG. 7B. It can be understood from the simulation results that, as compared with the conventional vehicle-mounted infrared lens unit 104, in vehicle-mounted infrared lens unit 4 in accordance with the first embodiment, the variations of MFP are small with temperature changes of ±60° C., and the values are kept constant at about 0.6. Therefore, it can be understood that vehicle-mounted infrared lens unit 4 in accordance with the first embodiment is significantly improved in the temperature characteristics of MTF. A distance M from the rear-side end of vehicle-mounted infrared lens unit 4 to the imaging surface of image pickup device 3a also changes with a temperature change of the surrounding environment, for example, because of the thermal expansion of the housing of infrared imaging apparatus 3. The simulation results shown in FIG. 7A and FIG. 7B were obtained when the simulation was performed with an aluminum housing of infrared imaging apparatus 3 and in consideration of the thermal expansion of the housing (this is applicable to the conventional vehicle-mounted infrared lens unit 104).

In vehicle-mounted infrared lens unit 4 in accordance with the first embodiment configured as described above, the thermal expansion coefficients (coefficients of linear expansion) of barrel 30 and spacer 40 are set as appropriate such that first infrared lens 10 held sandwiched between lens holding portion 31 and spacer 40 is pressed toward lens holding portion 31 by thermal expansion of spacer 40 and is moved against the elastic force of O-ring 60 inside barrel 30, thereby correcting a focal shift of vehicle-mounted infrared lens unit 4 caused by a temperature increase of the surrounding environment. When spacer 40 is shrunken because of a temperature drop of the surrounding environment, the elastic force of O-ring 60 at lens holding portion 31 causes first infrared lens 10 to move toward spacer 40, thereby correcting a focal shift caused by a temperature drop. Therefore, in vehicle-mounted infrared lens unit 4 in accordance with the first embodiment, the stable optical characteristics can be maintained without being affected by a temperature change of the surrounding environment. It is noted that when the focal point of vehicle-mounted infrared lens unit 4 is shifted away from image pickup device 3a because of a temperature increase, the materials of barrel 30 and spacer 40 can be determined such that the thermal expansion coefficient of spacer 40 is greater than the thermal expansion coefficient of barrel 30.

Because of the configuration in which outside fitting portions 41 and 42 are formed on the opposite ends of spacer 40 to allow first infrared lens 10 and second infrared lens 20 to be fitted at the opposite ends, the assembly of vehicle-mounted lens unit 4 can be carried out in such a manner that after first infrared lens 10 and second infrared lens 20 undergo an alignment operation and are adhesively fixed to spacer 40, the integrated spacer 40, first infrared lens 10, second infrared lens 20, and the like are inserted and fitted in barrel 30. Therefore, the alignment operation of first infrared lens 10 and second infrared lens 20 can be facilitated, and the assembly of vehicle-mounted infrared lens unit 4 can be facilitated.

In the present embodiment, barrel 30 and lens retainer 50 are formed of aluminum (Al), spacer 40 is formed of POM, and first infrared lens 10 and second infrared lens 20 are formed of zinc sulfide (ZnS). However, the materials of these components are shown only by way of example and are not limited thereto, and the components may be formed of any other materials.

Examples of materials of barrel 30 and spacer 40 are general aluminum alloys, general stainless steels, iron, magnesium, brass, titanium, FRP (fiber reinforced plastics), PE (polyethylene), PP (polypropylene), ABS (acrylonitrile butadiene styrene), PVC (polyvinyl chloride), PET (polyethylene terephthalate), PTFE (polytetrafluoroethylene), PC (polycarbonate), PBT (polybutylene terephtalate), PEI (polyetherimide), PEEK (polyether ether ketone), PAI (polyamide-imide), or PPS (polyphenylene sulfide), modified PPE (modified polyphenyleneether resin), PVDF (polyvinylidene fluoride), FEP (tetrafluoroethylene-hexafluoroprophylene copolymer), ETFE (tetrafluoroethylene-ethylene copolymer), PFA (tetrafluoroethylene-perfluoroalkylvinylether copolymer), PCTFE (polychlorotrifluoroethylene), and the like. A combination of materials suitable for correcting the focal shift amount of vehicle-mounted infrared lens unit 4 can be selected from these materials.

For example, a material such as germanium, chalcogenide glass, or ZnSe (zinc selenide) may be used as a material of the infrared lens.

In order to cope with a hot and humid environment, a synthetic resin with low moisture absorbency is preferably used as a material of spacer 40. For example, SPS (syndiotactic polystyrene) resin or PP/PPE resin (polymer alloy of PPE and PP) may be used as a material of spacer 40 to prevent reduction of accuracy in a hot and humid environment. The water absorbency of POM is about 0.22, whereas the water absorbency of SPS is about 0.04 and the water absorbency of PP/PPE is about 0.01 to 0.04. A test under a hot and humid environmental load at a temperature of 85° C. and a humidity of 95% for 400 hours was conducted on vehicle-mounted infrared lens unit 4 using each of POM, SPS, and PP/PPE as a material of spacer 40. As a result, in vehicle-mounted infrared lens unit 4 using POM, the positional variation of first infrared lens 10 was 40 μm or more after the test. By contrast, in vehicle-mounted infrared lens unit 4 using SPS and PP/PPE, the positional variation of first infrared lens 10 was less than 10 μm.

A similar configuration can be applied not only to an infrared lens unit having infrared lenses but also to a normal lens unit for passing and collecting visible light. Although vehicle-mounted infrared lens unit 4 in accordance with the present embodiment has two infrared lenses, the present invention is not limited thereto, and the infrared lens unit may have three or more lenses. O-ring 60 is used as a member for biasing first infrared lens 10 toward spacer 40 by elastic force. However, the present invention is not limited thereto, and any other elastic member such as a coil spring, a leaf spring, or a rubber packing may be used. An elastic member such as a O-ring may also be interposed between second infrared lens 20 and lens retainer 50. Although lens retainer 50 is screwed on and thus fixed to barrel 30, the present invention is not limited thereto, and the lens retainer may be fitted on and fixed to the barrel by adhesive or a screw.

Figure 8A:
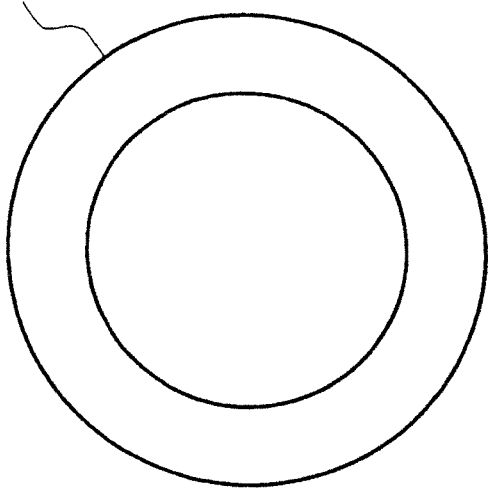
FIG. 8A is a diagram showing another example of a member for elastically biasing a first infrared lens.
Figure 8B:
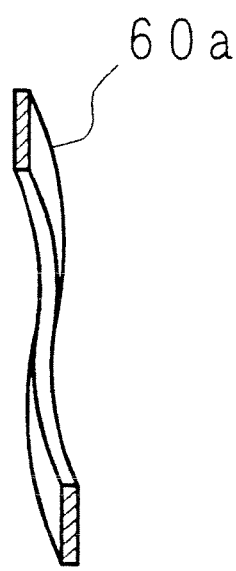
FIG. 8B is a diagram showing another example of a member for elastically biasing a first infrared lens.

FIG. 8A and FIG. 8B are diagrams showing another example of a member for elastically biasing first infrared lens 10. FIG. 8A shows a plan view of an elastic member, and FIG. 8B shows a cross-sectional view thereof. A waved washer 60a can be used in place of O-ring 60 as an elastic member for biasing infrared lens 10 toward spacer 40. Waved washer 60a is formed by bending an annular flat metal plate into a waved shape, and produces stress in the axial direction when being collapsed.

When waved washer 60a is interposed between lens holding portion 31 of barrel 30 and first infrared lens 10, first infrared lens 10 is biased toward the front side in the axial direction, that is, toward spacer 40. Accordingly, vehicle-mounted infrared lens 4 using waved washer 60a can achieve a similar effect as when O-ring 60 is used.

(First Modification)

Figure 9:
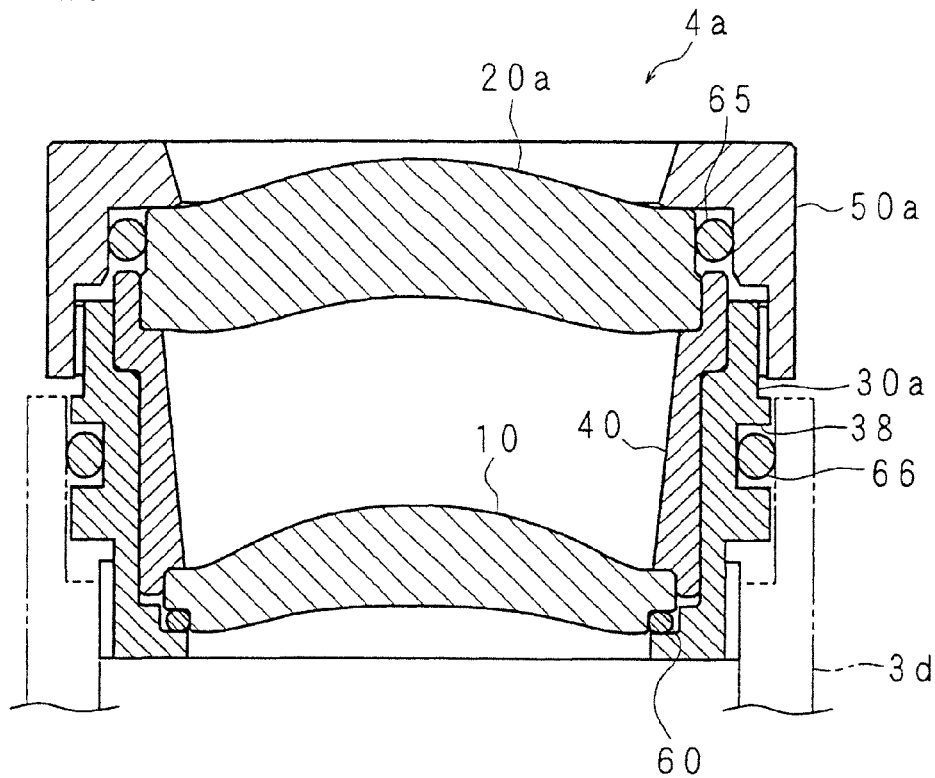
FIG. 9 is a schematic cross-sectional view showing a configuration of the vehicle-mounted infrared lens unit in accordance with a first modification of the first embodiment of the present invention.

FIG. 9 is a schematic cross-sectional view showing a configuration of a vehicle-mounted infrared lens unit 4a in accordance with a first modification of the first embodiment of the present invention. Vehicle-mounted infrared lens unit 4a in accordance with the shown first modification is almost the same as vehicle-mounted infrared lens unit 4 in accordance with the foregoing first embodiment in the configuration of moving first infrared lens 10 in response to a temperature change, except that a seal member for sealing the inside is added.

Vehicle-mounted infrared lens unit 4a in accordance with the first modification includes a seal member 65 interposed between a second infrared lens 20a and a lens retainer 50a. Seal member 65 is an annular member formed of a material such as rubber and having an approximately circular cross-sectional shape. The inner diameter of seal member 65 is smaller than the outer diameter of second infrared lens 20a. Therefore, seal member 65 can be expanded and fitted on the outside of second infrared lens 20a in order to be attached.

Lens retainer 50a has an inner diameter larger than the outer diameter of second infrared lens 20a. Thus, even when lens retainer 50a is screwed on and fixed to a barrel 30a, the inner circumferential surface of lens retainer 50a is not in abutment with the outer circumferential surface of second infrared lens 20a. The gap between the inner circumferential surface of lens retainer 50a and the outer circumferential surface of second infrared lens 20a is narrower than the diameter of seal member 65. Seal member 65 is put into this gap. Accordingly, seal member 65 is sealably interposed between the inner circumferential surface of lens retainer 50a and the outer circumferential surface of second infrared lens 20a, thereby sealing the inside of a barrel 30a.

On the outer circumferential surface of barrel 30a, a groove portion 38 is circumferentially formed around the entire circumference. A seal member 66 is attached in groove portion 38. Seal member 66 is an annular member formed of a material such as rubber and having an approximately circular cross-sectional shape, and can be expanded to be attached into groove portion 38 of barrel 30a. The depth (the length in the radial direction of barrel 30a) of groove portion 38 is smaller than the diameter of seal member 66.

The housing of infrared imaging apparatus 3 has a tubular protrusion portion 3d at a place where vehicle-mounted infrared lens unit 4a is attached. Tubular protrusion portion 3d has an inner diameter approximately equal to the outer diameter of barrel 30a of vehicle-mounted infrared lens unit 4a and is fitted onto barrel 30a so as to cover the outer circumferential surface of barrel 30a. When vehicle-mounted infrared lens unit 4a having seal member 66 attached in groove portion 38 is installed in housing 3d of infrared imaging apparatus 3, seal member 66 is in intimate contact with the inner circumferential surface of tubular protrusion portion 3d. Therefore, seal member 66 is interposed between the inner circumferential surface of tubular protrusion portion 3d of the housing and the outer circumferential surface of barrel 30a of vehicle-mounted infrared lens unit 4a, thereby sealing the inside of the housing of infrared imaging apparatus 3.

(Second Modification)

Figure 10:
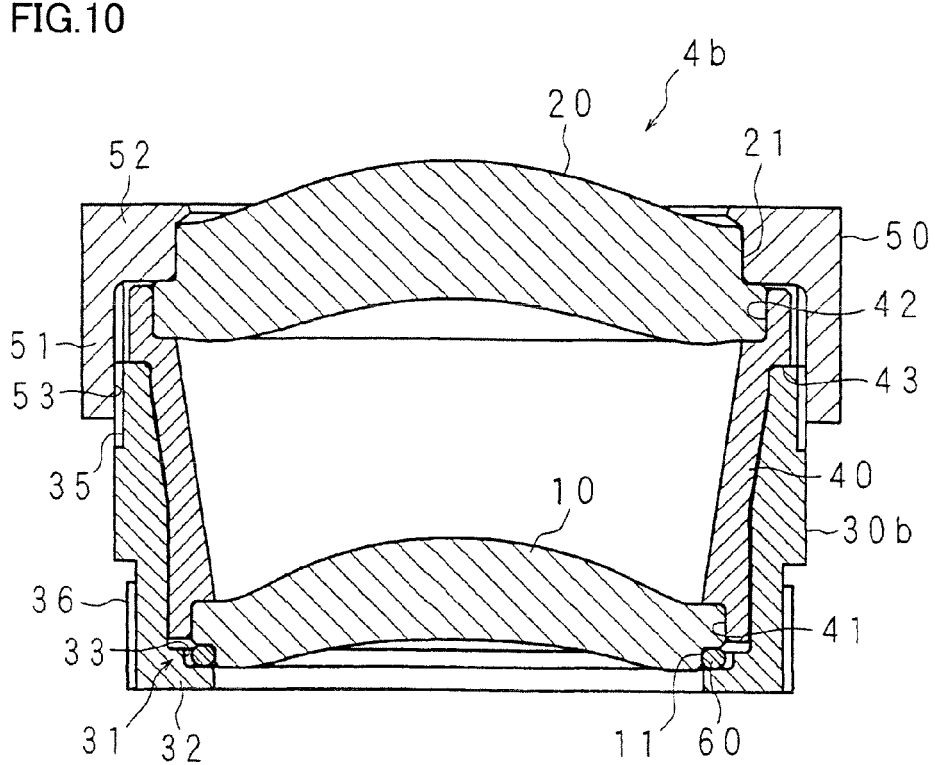
FIG. 10 is a schematic cross-sectional view showing a configuration of the vehicle-mounted infrared lens unit in accordance with a second modification of the first embodiment of the present invention.

FIG. 10 is a schematic cross-sectional view showing a configuration of a vehicle-mounted infrared lens unit 4b in accordance with a second modification of the first embodiment of the present invention. Vehicle-mounted infrared lens unit 4b in accordance with the shown second modification is almost the same as vehicle-mounted infrared lens unit 4 (see FIG. 4) in accordance with the foregoing first embodiment in the configuration of moving first infrared lens 10 in response to a temperature change, except that a configuration of a barrel 30b differs from that of barrel 30 of vehicle-mounted infrared lens unit 4 shown in FIG. 4.

Barrel 30b of vehicle-mounted infrared lens unit 4b in accordance with the second modification is configured such that step portion 34 of barrel 30 of vehicle-mounted infrared lens unit 4 shown in FIG. 4 is not formed on the inner circumferential surface of the front-side end. The inner circumferential surface of barrel 30b in the second modification is formed in a shape corresponding to that portion of the outer circumferential surface of spacer 40 which is closer to the rear side than step portion 43. In other words, the inner circumferential surface of barrel 30b is formed such that the inner diameter is approximately constant from the portion where lens holding portion 31 is provided to the central portion in the axial direction, and is formed to be tapered such that the diameter increases from the central portion toward the front side. The inner diameter of the front-side end of barrel 30b is approximately equal to the smaller outer diameter of the step-like portion formed at step portion 43 of spacer 40. Therefore, spacer 40 inserted from the front side of barrel 30b has step portion 43 coming into abutment with the front-side end surface of barrel 30b, whereby further insertion into barrel 30b toward the rear side is locked. In this state, a sufficient gap is provided between the rear-side end surface of spacer 40 and the front portion of lens holding portion 31 of barrel 30b so that they are not in abutment with each other.

Since it is not necessary to form step portion 34 on the inner circumferential surface of the front-side end of barrel 30b in the second modification, the thickness of the front-side end (that is, the outer diameter of barrel 30b) can be reduced as compared with barrel 30 of vehicle-mounted infrared lens unit 4 shown in FIG. 4. Therefore, the outer shape of lens retainer 50 fixed to the front-side end of barrel 30b can be reduced. Advantageously, the size of vehicle-mounted lens unit 4b can be reduced.

FIG. 11A, FIG. 11B, FIG. 12A, FIG. 12B, FIG. 13A, FIG. 13B, FIG. 14A, and FIG. 14B are diagrams showing simulation results of vehicle-mounted infrared lens unit 4b in accordance with the second modification. The changes of MTF with temperature changes in the conventional vehicle-mounted infrared lens unit 104 (see FIG. 27) and vehicle-mounted infrared lens unit 4b in accordance with the second modification were simulated, and the results are shown in the tables in FIG. 11A, FIG. 12A, FIG. 13A, and FIG. 14A and in the graphs in FIG. 11B, FIG. 12B, FIG. 13B, and FIG. 14B. In those figures, the simulation results of vehicle-mounted infrared lens unit 4b in accordance with the second modification are shown as "with temperature compensation," and the simulation results of the conventional vehicle-mounted infrared lens unit 104 are shown as "without temperature compensation."

Figures 11A, 11B:
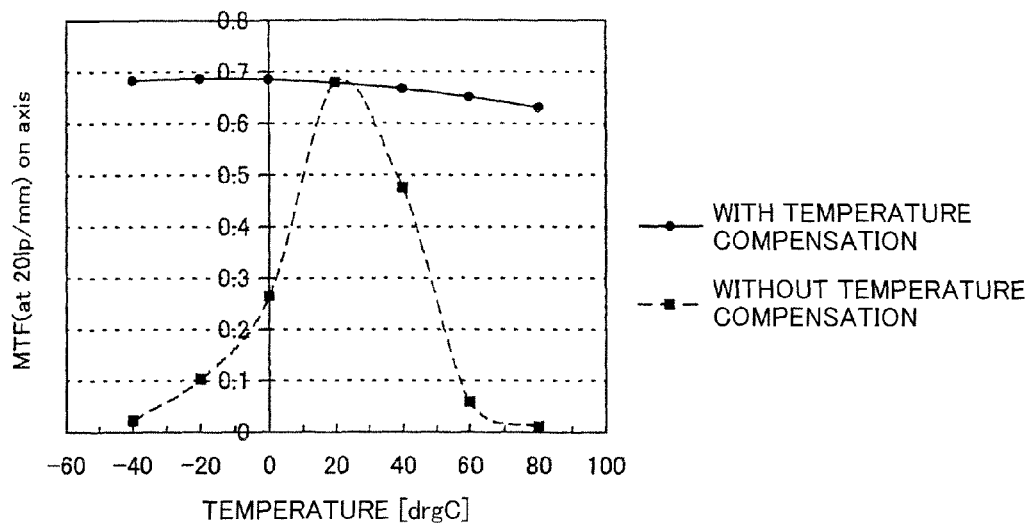
FIG. 11A is a diagram showing a simulation result of the vehicle-mounted infrared lens unit in accordance with the second modification.
FIG. 11B is a diagram showing a simulation result of the vehicle-mounted infrared lens unit in accordance with the second modification.

The simulation results shown in FIG. 11A and FIG. 11B were obtained when the material of first infrared lens 10 was ZnS (coefficient of linear expansion=$6.6 \times 10^{-6}$), the material of second infrared lens 20 was germanium (Ge), the material of barrel 30b was aluminum (coefficient of linear expansion=$21 \times 10^{-6}$), the material of the spacer was POM (coefficient of linear expansion=$270 \times 10^{-6}$), and first infrared lens 10 was moved by 79 μm in response to a temperature change of 60° C.

Figures 12A, 12B:
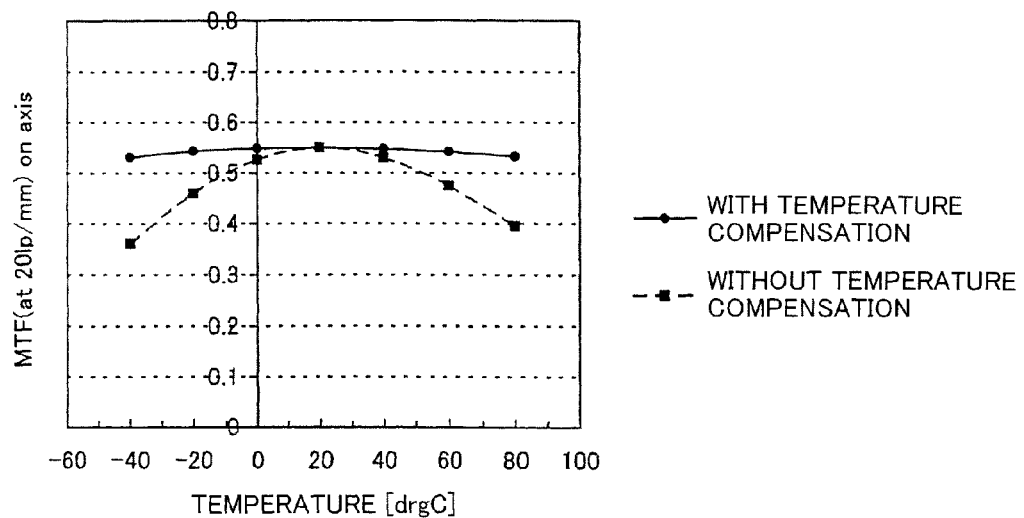
FIG. 12A is a diagram showing a simulation result of the vehicle-mounted infrared lens unit in accordance with the second modification.
FIG. 12B is a diagram showing a simulation result of the vehicle-mounted infrared lens unit in accordance with the second modification.

The simulation results shown in FIG. 12A and FIG. 12B were obtained when the material of first infrared lens 10 and second infrared lens 20 was ZnS (coefficient of linear expansion=$6.6 \times 10^{-6}$), the material of barrel 30b was aluminum (coefficient of linear expansion=$21 \times 10^{-6}$), the material of the spacer was POM (coefficient of linear expansion=$100 \times 10^{-6}$), and first infrared lens 10 was moved by 43 µm in response to a temperature change of 60° C.

Figures 13A, 13B:
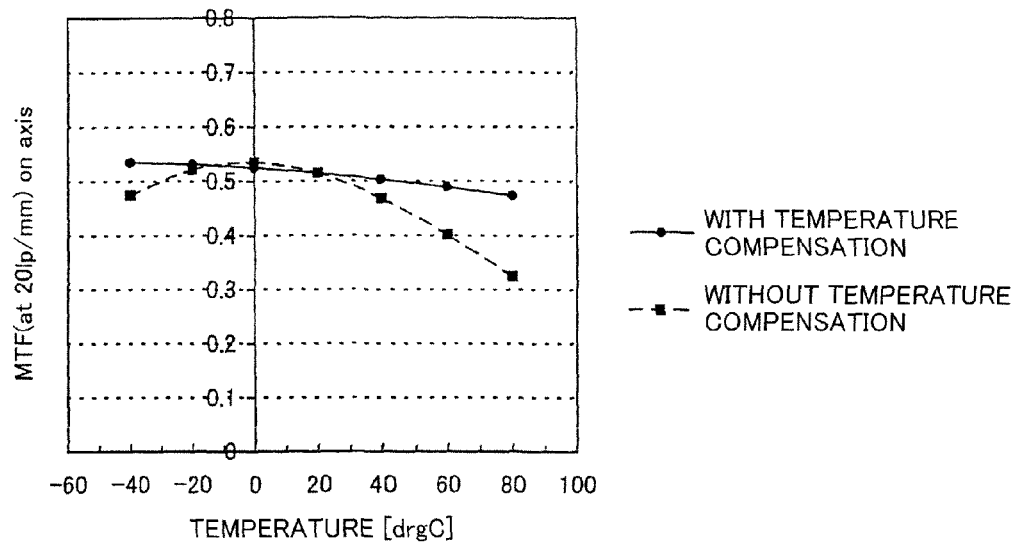
FIG. 13A is a diagram showing a simulation result of the vehicle-mounted infrared lens unit in accordance with the second modification.
FIG. 13B is a diagram showing a simulation result of the vehicle-mounted infrared lens unit in accordance with the second modification.

The simulation results shown in FIG. 13A and FIG. 13B were obtained when the material of first infrared lens 10 and second infrared lens 20 was ZnS (coefficient of linear expansion=$6.6 \times 10^{-6}$), the material of barrel 30b was aluminum (coefficient of linear expansion=$21 \times 10^{-6}$), the material of the spacer was POM (coefficient of linear expansion=$120 \times 10^{-6}$), and first infrared lens 10 was moved by 43 µm in response to a temperature change of 60° C.

Figures 14A, 14B:
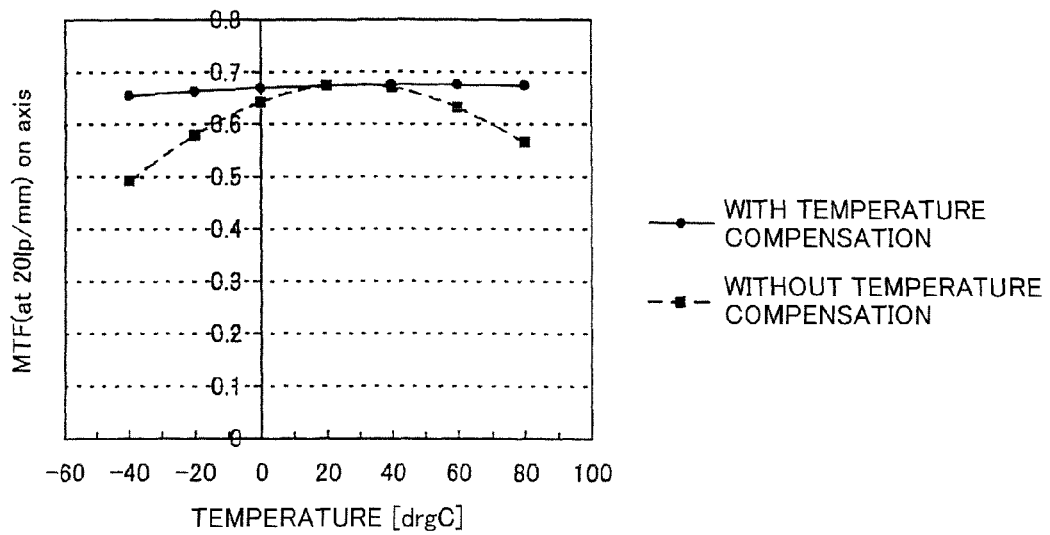
FIG. 14A is a diagram showing a simulation result of the vehicle-mounted infrared lens unit in accordance with the second modification.
FIG. 14B is a diagram showing a simulation result of the vehicle-mounted infrared lens unit in accordance with the second modification.

The simulation results shown in FIG. 14A and FIG. 14B were obtained when the material of first infrared lens 10 and second infrared lens 20 was chalcogenide glass, the material of barrel 30b was aluminum (coefficient of linear expansion=$21 \times 10^{-6}$), the material of the spacer was POM (coefficient of linear expansion=$110 \times 10^{-6}$), and first infrared lens 10 was moved by 52 µm in response to a temperature change of 60° C.

It can be understood from the simulation results that the optical characteristics of the conventional vehicle-mounted infrared lens unit 104 are deteriorated when the temperature rises or drops. By contrast, in vehicle-mounted infrared lens unit 4b in accordance with the second modification, the variations of MFP are small with the temperature changes of ±60° C., and the values are kept almost constant. Therefore, it can be understood that vehicle-mounted infrared lens unit 4b in accordance with the second modification is significantly improved in the temperature characteristics of MTF.

(Third Modification)

Figure 15:
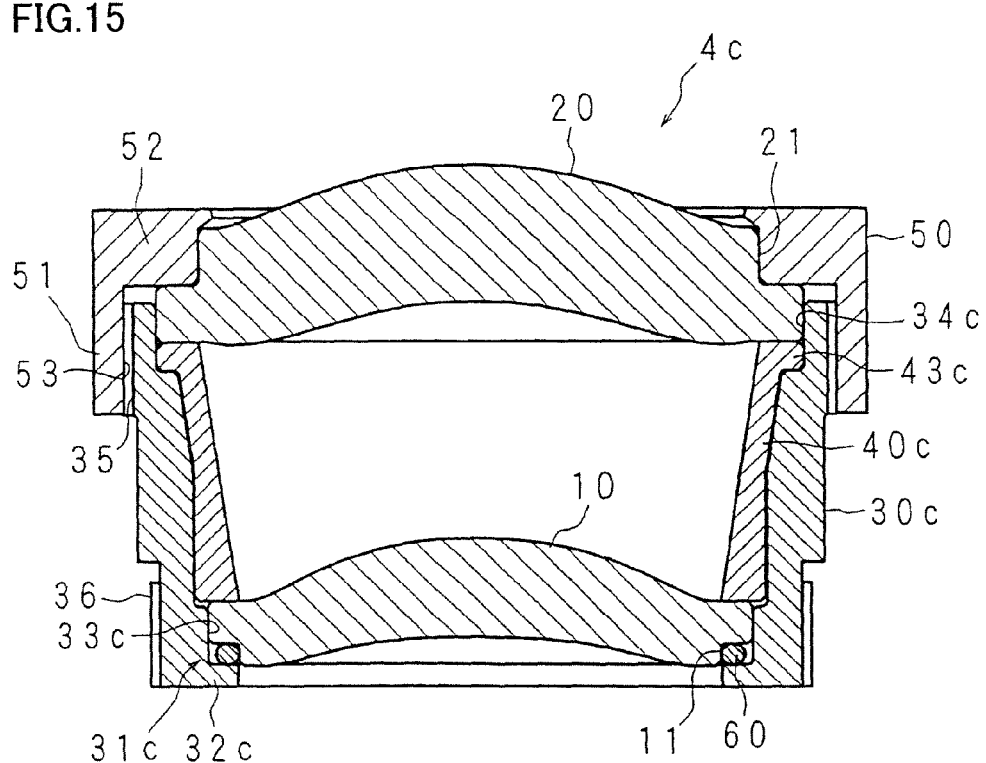
FIG. 15 is a schematic cross-sectional view showing a configuration of the vehicle-mounted infrared lens unit in accordance with a third modification of the first embodiment of the present invention.

FIG. 15 is a schematic cross-sectional view showing a configuration of a vehicle-mounted infrared lens unit 4c in accordance with a third modification of the first embodiment of the present invention. Vehicle-mounted infrared lens unit 4c in accordance with the shown third modification is almost the same as vehicle-mounted infrared lens unit 4 (see FIG. 4) in accordance with the foregoing first embodiment in the configuration of moving first infrared lens 10 in response to a temperature change, except that the configuration of a barrel 30c and a spacer 40c differs from that of barrel 30 and spacer 40 of vehicle-mounted infrared lens unit 4 shown in FIG. 4.

In spacer 40c of vehicle-mounted infrared lens unit 4c in accordance with the third modification, first outside fitting portion 41 and second outside fitting portion 42 of spacer 40 of vehicle-mounted infrared lens unit 4 shown in FIG. 4 are not formed at the opposite ends thereof. Spacer 40c in the third modification has a flange portion 43c formed around the outer circumferential surface of the front-side end. Accordingly, the outer diameter of the front-side end of spacer 40c is approximately equal to the inner diameter of the front-side end of barrel 30c (a larger inner diameter portion of a step portion 34c). Therefore, spacer 40c inserted from the front side of barrel 30c has flange portion 43c coming into abutment with step portion 34c of barrel 30c, whereby further insertion toward the rear side is locked. In this state, a sufficient gap is provided between the rear-side end surface of spacer 40c and the front portion of a lens holding portion 31c of barrel 30c so that they are not in abutment with each other. The outer diameter of flange portion 43c of spacer 40c is approximately equal to the diameter of the rear side of second infrared lens 20, and the front-side end surface of spacer 40c is in abutment with the peripheral portion of the rear surface of second infrared lens 20.

On the inner circumferential surface of barrel 30c, step portion 34c is formed like a step such that the inner diameter increases stepwise in the vicinity of the front-side end. Accordingly, the inner diameter of the front-side end of barrel 30c is approximately equal to the outer diameter of flange portion 43c of spacer 40c and is approximately equal to the diameter of the rear side of second infrared lens 20. Accordingly, step portion 34c of barrel 30c is fitted on the outside of the rear-side portion of second infrared lens 20, thereby positioning second infrared lens 20 in the direction vertical to the axial direction. Second infrared lens 20 fitted in step portion 34c of barrel 30c is sandwiched between the front-side end surface of spacer 40c locked by step portion 34c of barrel 30c and retaining portion 52 of lens retainer 50, so that its movement in the axial direction is locked.

Lens holding portion 31c provided on the inner circumferential surface of the rear side of barrel 30c is configured to have an annular lock portion 32c projected on the inner circumferential surface of barrel 30c around the entire circumference and a step portion 33c formed like a step at the front side of lock portion 32c such that the inner peripheral portion is depressed around the entire circumference. Lens holding portion 31c locks the movement of first infrared lens 10 toward the rear side at lock portion 32c and is fitted on the outside of first infrared lens 10 at step portion 33c, thereby positioning first infrared lens 10 in the direction vertical to the axial direction.

In other words, because of the formation of step portion 33c, lens holding portion 31c of barrel 30c has a portion that is fitted on the outside of the front-side portion of first infrared lens 10, and first infrared lens 10 fitted in this portion is locked by lock portion 32c from moving toward the rear side. O-ring 60 is interposed between first infrared lens 10 and lock portion 32c of lens holding portion 31c. The peripheral portion of the front surface of first infrared lens 10 is in abutment with the rear-side end surface of spacer 40c inserted into barrel 30ca, so that first infrared lens 10 is held sandwiched between spacer 40c and lock portion 32c of lens holding portion 31c.

In assembly of vehicle-mounted infrared lens unit 4c, first, O-ring 60 is attached to step portion 11 formed at the rear side of first infrared lens 10, and first infrared lens 10 is inserted into barrel 30c to be fitted in lens holding portion 31c. Then, spacer 40c is inserted into barrel 30c until flange portion 43c comes into abutment with step portion 34c and is locked. Thereafter, second infrared lens 20 is inserted into barrel 30c and fitted in step portion 34c. Thereafter, lens retainer 50 is screwed on the front side of barrel 30c through a rotating operation, and lens retainer 50 is fixed to barrel 30c using adhesive or the like. The assembly of vehicle-mounted infrared lens unit 4c is thus completed.

In vehicle-mounted infrared lens unit 4c in accordance with the third modification configured as described above, the outside fitting portions fitted on first infrared lens 10 and second infrared lens 20 are not provided on the opposite ends of spacer 40c, but step portions 33c and 34c fitted on the outside of first infrared lens 10 and second infrared lens 20 are provided on barrel 30c. Even with this configuration, similarly to vehicle-mounted infrared lens unit 4 in accordance with the first embodiment shown in FIG. 4, the thermal expansion coefficients (coefficients of linear expansion) of barrel 30c and spacer 40c are set as appropriate such that first infrared lens 10 sandwiched between lens holding portion 31c and spacer 40c is pressed toward lens holding portion 31c by thermal expansion of spacer 40c and is moved inside barrel 30c against the elastic force of O-ring 60, whereby the focal shift of vehicle-mounted infrared lens unit 4c caused by a temperature increase of the surrounding environment can be corrected. On the other hand, when spacer 40c is shrunken due to a temperature drop of the surrounding environment, the elastic force of O-ring 60 at lens holding portion 31c causes first infrared lens 10 to move toward spacer 40c, so that the focal shift caused by a temperature drop can be corrected.

Second Embodiment

Figure 16:
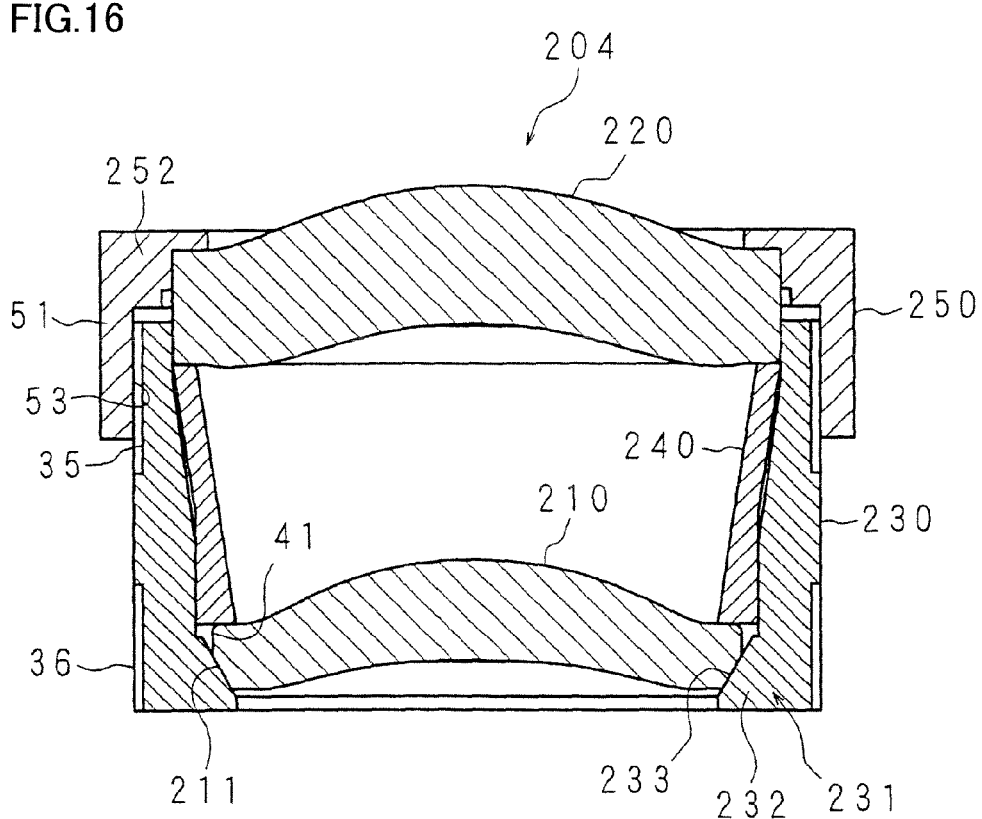
FIG. 16 is a schematic cross-sectional view showing a configuration of the vehicle-mounted infrared lens unit in accordance with a second embodiment of the present invention.

FIG. 16 is a schematic cross-sectional view showing a configuration of a vehicle-mounted infrared lens unit 204 in accordance with a second embodiment of the present invention. Similar to vehicle-mounted infrared lens unit 4 in accordance with the first embodiment, vehicle-mounted infrared lens unit 204 in accordance with the second embodiment is configured such that a first infrared lens 210, a spacer 240, and a second infrared lens 220 are inserted into a barrel 230 and they are retained by a lens retainer 250 to be held in barrel 230.

First infrared lens 210 and second infrared lens 220 are each formed in the shape of a disk and each are a meniscus lens having a convex surface on the front side and having a concave surface on the rear side. The peripheral portions of the front and rear surfaces of second infrared lens 220 are formed to be smooth. The peripheral portion of the front side of first infrared lens 210 is formed to be smooth. The peripheral portion of the rear side of first infrared lens 210 is formed to be tapered. A tapered surface 211 of first infrared lens 210 is shaped such that the diameter increases from the rear side toward the front side.

Spacer 240 is formed in the shape of a cylinder having an outer diameter approximately equal to the inner diameter of barrel 230 and can be fitted on the inside of barrel 230. Inside barrel 230, the rear-side end surface of spacer 240 is in abutment with the peripheral portion of the front side of first infrared lens 210, and the front-side end surface of spacer 240 is in abutment with the peripheral portion of the rear side of second infrared lens 220. In other words, spacer 240 is interposed between first infrared lens 210 and second infrared lens 220 inside barrel 230 to position those infrared lenses in the axial direction.

Barrel 230 is formed in the shape of a cylinder and has a lens holding portion 231 at the rear-side end for holding first infrared lens 210 on the inner circumferential thereof. Lens holding portion 231 has an annular abutment portion 232 formed such that the inner circumferential surface of barrel 230 is protruded around the entire circumference. Abutment portion 232 is in abutment with the peripheral portion of the rear side of first infrared lens 210 thereby locking the movement of first infrared lens 210 toward the rear side. The inner peripheral portion of the front side of abutment portion 232 is formed to be tapered. A tapered surface 233 of lens holding portion 232 is shaped such that the diameter increases from the rear side to the front side. Tapered surface 233 is formed at the approximately same angle as the corresponding angle of the peripheral portion of first infrared lens 210, so that tapered surface 211 of first infrared lens 210 and tapered surface 233 of lens holding portion 231 are in abutment with each other. First infrared lens 210 can be held in such a manner that first infrared lens 210 is sandwiched between the rear-side end surface of spacer 240 fitted on the inside of barrel 230 and abutment portion 232 of lens holding portion 231.

Lens retainer 250 has cylindrical tube portion 51 having thread groove portion 53 on the inner circumferential surface thereof and an annular retaining portion 252 provided at the front-side end of tube portion 51 around the inner circumferential surface. Thread groove portion 53 is screwed on thread groove portion 35 formed at the front-side end of barrel 230. Annular retaining portion 252 has a portion in abutment with the front-side peripheral portion and the outer circumferential surface closer to the front surface of second infrared lens 220. Lens retainer 250 screwed from the front side of barrel 230 through a rotating operation is fitted on the outside of second infrared lens 220 held by barrel 230. Lens retainer 250 is further rotated to push down and press second infrared lens 220 toward the rear side, thereby fixing first infrared lens 210, spacer 240, and second infrared lens 220 inside barrel 230.

In assembly of vehicle-mounted infrared lens unit 204 in accordance with the second embodiment, first, first infrared lens 210 is inserted into barrel 230, so that tapered surface 211 formed at the rear-side peripheral portion of first infrared lens 210 comes into abutment with tapered surface 233 formed at lens holding portion 231 of barrel 230. Then, spacer 240 is inserted into and fitted in barrel 230, so that the rear-side end surface thereof comes into abutment with the front-side peripheral portion of first infrared lens 210. Thus, first infrared lens 210 is held sandwiched between spacer 240 and lens holding portion 231 of barrel 230. Thereafter, second infrared lens 220 is inserted into barrel 230 so as to come into abutment with the front-side end surface of spacer 240. Lens retainer 250 is screwed on barrel 230 with adhesive being applied to thread groove portion 35 of barrel 230, and the adhesive is allowed to be set. The assembly of vehicle-mounted infrared lens unit 204 is thus completed.

The function of correcting a focal shift caused by a temperature change in vehicle-mounted infrared lens unit 204 in accordance with the second embodiment will now be described. Here, let L be the axial length of spacer 240 (the distance between first infrared lens 210 and second infrared lens 220), θ be the angle formed by tapered surface 211 of first infrared lens 210 and tapered surface 233 of lens holding portion 231 with the central axis of barrel 230, and r be the inner diameter of lens holding portion 231 (the inner diameter in the middle of tapered surface 233). Let α1 be the thermal expansion coefficient of barrel 230, α2 be the thermal expansion coefficient of first infrared lens 210 and second infrared lens 220, and α3 be the thermal expansion coefficient of spacer 240.

When the temperature of the surrounding environment rises, the inner diameter of barrel 230 is increased due to thermal expansion. Thus, if thermal expansion coefficient α2 of first infrared lens 210 is smaller than thermal expansion coefficient α1 of barrel 230 (α1>α2), the distance between lens holding portion 231 and first infrared lens 210 increases to produce a gap. Here, since the abutment portion between lens holding portion 231 and first infrared lens 210 is formed to be tapered, first infrared lens 210 can be moved in the axial direction toward the rear side (that is, the direction in which the diameter of the tapered shape decreases). Spacer 240 is also thermally expanded due to the temperature increases. If thermal expansion coefficient α3 of spacer 240 is larger than thermal expansion coefficient α1 of barrel 230 (α3>α1), spacer 240 presses first infrared lens 210 as a result of thermal expansion and moves first infrared lens 210 toward the rear side in the axial direction. Conversely, when the temperature of the surrounding environment drops, the inner diameter of barrel 230 is reduced, and spacer 240 is reduced in the axial direction, so that first infrared lens 210 moves toward the front side in the axial direction.

Therefore, if a temperature change of the surrounding environment is ΔT, a distance ΔZ of movement of first infrared lens 210 in the axial direction is represented by the following equation (2).

$$\Delta Z = r \times (\alpha 1 - \alpha 2) \times \Delta T / \tan \theta \quad (2)$$

Based on this equation (2), the material of barrel 230 (specifically, thermal expansion coefficient α1) and the angle θ of tapered surface 233 are adjusted such that distance ΔZ of movement of first infrared lens 210 has a value closer to the amount of focal shift for temperature change ΔT.

A distance ΔL of movement of the rear-side end surface of spacer 240 in the axial direction is represented by the following equation (3).

$$\Delta L = L \times (\alpha 3 - \alpha 1) \times \Delta T \quad (3)$$

Based on the equations (2) and (3) above, the material of spacer 240 (specifically, thermal expansion coefficient α3) is determined such that distance ΔZ of movement of first infrared lens 210 and distance ΔL of movement of spacer 240 become close to each other (such that ΔZ≈ΔL). For example, as shown in FIG. 6, this can be achieved when barrel 230 and lens retainer 250 are formed of aluminum, first infrared lens 210 and second infrared lens 220 are formed of ZnS, and spacer 240 is formed of POM.

In vehicle-mounted infrared lens unit 204 in accordance with the second embodiment configured as described above, the rear-side peripheral portion of first infrared lens 210 is formed to be tapered, and lens holding portion 231 of barrel 230 is formed to be tapered correspondingly, and in addition, spacer 240 presses first infrared lens 210 toward the rear side by thermal expansion, whereby first infrared lens 210 can be moved in the axial direction as a result of thermal expansion/shrinkage of barrel 230. Therefore, the material, shape, etc. of the components of vehicle-mounted infrared lens unit 204 are determined in accordance with thermal expansion coefficients α1, α2, α3 and the angle θ of tapered surface 233 derived from the equations (2) and (3) above, so that the focal shift of vehicle-mounted infrared lens unit 204 caused by a temperature change can be cancelled by the movement of first infrared lens 210 inside barrel 230 and thus be corrected.

The other configuration of vehicle-mounted infrared lens unit 204 in accordance with the second embodiment is similar to the configuration of vehicle-mounted infrared lens unit 4 in accordance with the first embodiment. Therefore, the similar parts are denoted with the same reference numerals and a detailed description thereof is not repeated.

(Modification)

Figure 17:
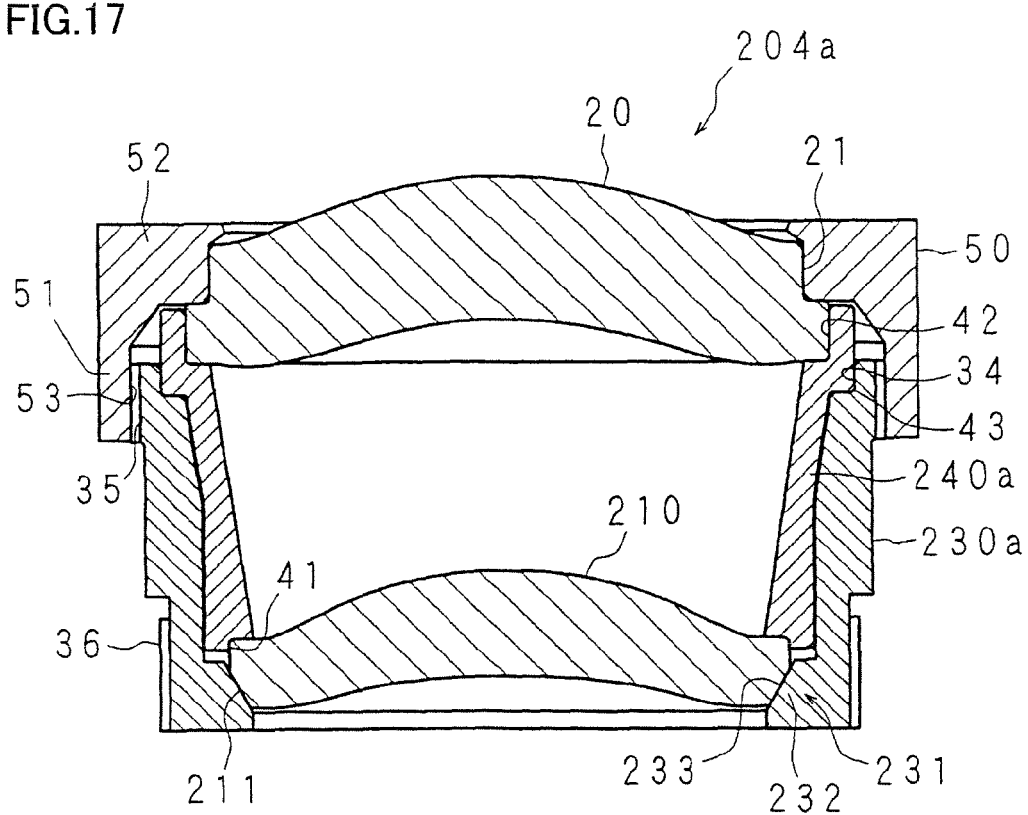
FIG. 17 is a schematic cross-sectional view showing a configuration of the vehicle-mounted infrared lens unit in accordance with a modification of the second embodiment of the present invention.

FIG. 17 is a schematic cross-sectional view showing a configuration of a vehicle-mounted infrared lens unit 204a in accordance with a modification of the second embodiment of the present invention. Spacer 240 of vehicle-mounted infrared lens unit 204 in the foregoing second embodiment simply has the rear-side end surface in abutment with first infrared lens 210 and the front-side end surface in abutment with second infrared lens 220. However, outside fitting portions 41 and 42 may be provided at the opposite ends, as in spacer 40 of vehicle-mounted infrared lens unit 4 in accordance with the first embodiment.

A spacer 240a of vehicle-mounted infrared lens unit 204a in accordance with the modification has first outside fitting portion 41 at the rear-side end thereof and second outside fitting portion 42 at the front-side end thereof. Accordingly, the alignment operation is carried out by fitting first infrared lens 210 in first outside fitting portion 41 and fitting second infrared lens 20 in second outside fitting portion 42, and those infrared lenses can be inserted into barrel 230a after being adhesively fixed to and integrated with spacer 240a.

The rear-side peripheral portion of first infrared lens 210 is formed to be tapered, and lens holding portion 231 of a barrel 230a has tapered surface 233 in abutment with tapered surface 211 of first infrared lens 210. Accordingly, similarly to vehicle-mounted infrared lens 204 in accordance with the foregoing second embodiment, first infrared lens 210 can be moved in the axial direction inside barrel 230a in response to a temperature change, so that the focal shift of vehicle-mounted infrared lens unit 204a caused by a temperature change can be corrected.

Third Embodiment

Figure 18:
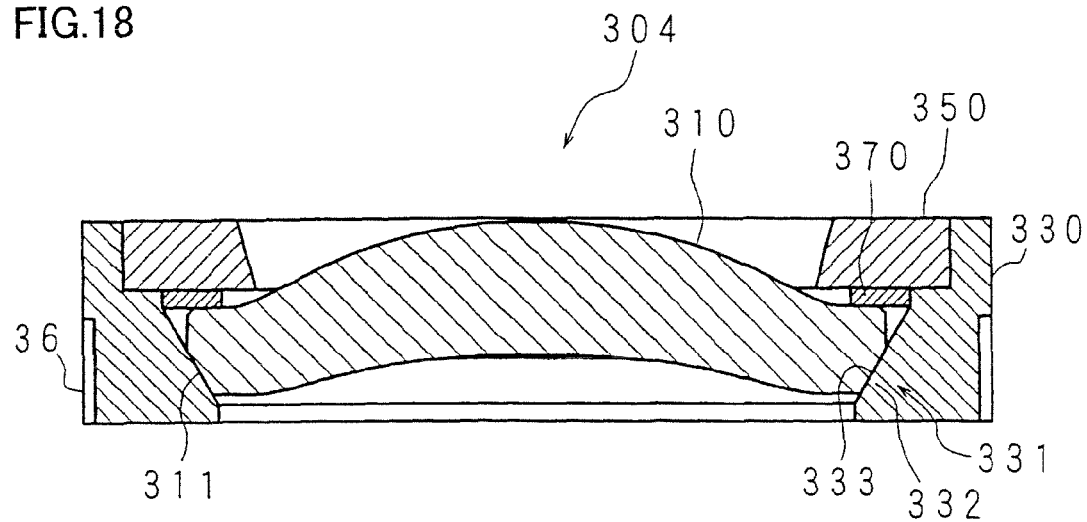
FIG. 18 is a schematic cross-sectional view showing a configuration of the vehicle-mounted infrared lens unit in accordance with a third embodiment of the present invention.

FIG. 18 is a schematic cross-sectional view showing a configuration of a vehicle-mounted infrared lens unit 304 in accordance with a third embodiment of the present invention. The vehicle-mounted infrared lens unit in the foregoing first and second embodiments includes two infrared lenses, wherein the first infrared lens is pressed by the thermal expansion of the spacer to move inside the barrel. By contrast, vehicle-mounted infrared lens unit 304 in accordance with the third embodiment includes only one infrared lens 310 and therefore does not include a spacer provided between two infrared lenses. Vehicle-mounted infrared lens unit 304 in accordance with the third embodiment is configured such that infrared lens 310 is inserted into a barrel 330 and is retained by a lens retainer 350 and a spring member (pressing member) 370 to be held in barrel 330.

Infrared lens 310, formed in the shape of a disk, is a meniscus lens having a convex surface on the front side and having a concave surface on the rear side. Infrared lens 310 has a front-side peripheral portion formed to be smooth and has a rear-side peripheral portion formed to be tapered. A tapered surface 311 of infrared lens 310 is shaped such that the diameter increases from the rear side toward the front side.

Barrel 330, formed in the shape of a cylinder, has a lens holding portion 331 at the rear-side end for holding infrared lens 310 on the inner circumferential surface thereof. Lens holding portion 331 has a similar configuration as lens holding portion 231 provided in barrel 230 of vehicle-mounted infrared lens unit 204 in accordance with the second embodiment and has an annular abutment portion 332 formed such that the inner circumferential surface of barrel 330 is protruded around the entire circumference. Abutment portion 332 is in abutment with the rear-side peripheral portion of infrared lens 310 thereby locking the movement of infrared lens 310 toward the rear side. The front-side inner peripheral portion of abutment portion 332 is formed to be tapered. A tapered surface 333 of lens holding portion 331 is formed such that the diameter increases from the rear side toward the front side. Tapered surface 333 is formed at the approximately same angle as the corresponding angle of the peripheral portion of infrared lens 310, so that tapered surface 311 of infrared lens 310 and tapered surface 333 of lens holding portion 331 are in abutment with each other.

Lens retainer 350, formed in an annular shape, is fitted on the inside of the front-side end of barrel 330. Here, lens retainer 350 is not in contact with infrared lens 310 inside barrel 330 and retains infrared lens 310 with spring member 370 interposed. Spring member 370 is a coil spring and is interposed between the front-side peripheral portion of infrared lens 310 and the rear surface of lens retainer 350 to press infrared lens 310 toward the rear side. Lens retainer 350 fitted in barrel 330 is fixed by adhesive or the like. Infrared lens 310 is held inside barrel 330 so as to be sandwiched between lens holding portion 331 of barrel 330 and lens retainer 350 with spring member 370 interposed therebetween.

Here, let θ be the angle formed by tapered surface 311 of first infrared lens 310 and tapered surface 333 of lens holding portion 331 with the central axis of barrel 330, and r be the inner diameter of lens holding portion 331 (the inner diameter in the middle of tapered surface 333). Let α1 be the thermal expansion coefficient of barrel 330, and α2 be the thermal expansion coefficient of infrared lens 310.

When the temperature of the surrounding environment rises, the inner diameter of barrel 330 is increased due to thermal expansion. Thus, if thermal expansion coefficient α2 of infrared lens 310 is smaller than thermal expansion coefficient α1 of barrel 330 (α1>α2), the distance between lens holding portion 331 and infrared lens 310 increases to produce a gap. Since the abutment portion between lens holding portion 331 and infrared lens 310 is formed to be tapered, infrared lens 310 can be moved in the axial direction toward the rear side. Here, infrared lens 310 is pressed toward the rear side by spring member 370 and is thus moved toward the rear side. Conversely, when the temperature of the surrounding environment drops, the inner diameter of barrel 330 is reduced, so that infrared lens 310 moves toward the front side against the pressing force of spring member 370.

Therefore, if a temperature change of the surrounding environment is ΔT, a distance ΔZ of movement of infrared lens 310 in the axial direction is represented by the following equation (4).

$$\Delta Z = r \times (\alpha 1 - \alpha 2) \times \Delta T / \tan \theta \quad (4)$$

Based on this equation (4), the material of barrel 330 (specifically, thermal expansion coefficient α1) and the angle θ of tapered surface 333 are adjusted such that distance ΔZ of movement of infrared lens 310 has a value closer to the amount of focal shift for temperature change ΔT. For example, as shown in FIG. 6, this can be achieved when barrel 330 and lens retainer 350 are formed of aluminum and infrared lens 310 is formed of ZnS.

In vehicle-mounted infrared lens unit 304 in accordance with the third embodiment configured as described above, although a spacer is not provided as in the vehicle-mounted infrared lens unit in accordance with the first embodiment or the second embodiment, the peripheral portion of infrared lens 310 and lens holding portion 331 of barrel 330 are formed to be tapered, and spring member 370 presses infrared lens 310 toward lens holding portion 331, whereby infrared lens 310 can be moved in the axial direction by expansion/shrinkage of barrel 330 as a result of a temperature change. Therefore, the material of barrel 330 (specifically, thermal expansion coefficients α1) and the angle of tapered surface 333 are determined as appropriate based on the equation (4) above, so that the focal shift of vehicle-mounted infrared lens unit 304 caused by a temperature change can be cancelled by the movement of infrared lens 310 inside barrel 330 and thus be corrected.

Although a member for pressing infrared lens 310 toward lens holding portion 331 is spring member 370 in the present embodiment, the present invention is not limited thereto, and it may be any other member such as a leaf spring or an O-ring.

The other configuration of vehicle-mounted infrared lens unit 304 in accordance with the third embodiment is similar to the configuration of vehicle-mounted infrared lens unit 4 in accordance with the first embodiment. Therefore, the similar parts are denoted with the same reference numerals and a detailed description thereof is not repeated.

Fourth Embodiment

Figure 19:
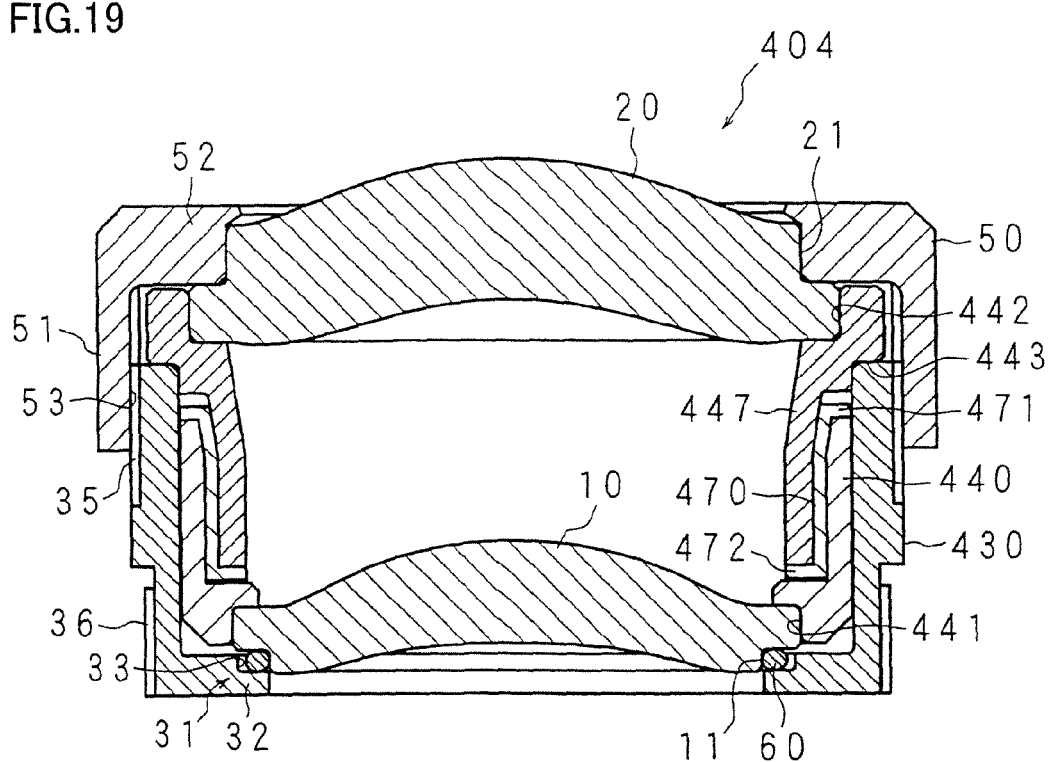
FIG. 19 is a schematic cross-sectional view showing a configuration of the vehicle-mounted infrared lens unit in accordance with a fourth embodiment of the present invention.

FIG. 19 is a schematic cross-sectional view showing a configuration of a vehicle-mounted infrared lens unit 404 in accordance with a fourth embodiment of the present invention. The vehicle-mounted infrared lens unit in accordance with the foregoing first and second embodiments is configured such that one spacer is interposed between first infrared lens 10 and second infrared lens 20, whereas the vehicle-mounted infrared lens unit in accordance with the fourth embodiment is configured such that two spacers, namely, a first spacer 440 and a second spacer 447, are interposed between first infrared lens 10 and second infrared lens 20.

First spacer 440, formed in the shape of a cylinder, has an outer diameter approximately equal to the inner diameter of a barrel 430 and can be inserted into barrel 430 from the front side to be fitted on the inside of barrel 430. At the rear-side end of first spacer 440, a protrusion portion is provided in such a manner that the inner circumferential surface is protruded inward around the entire circumference. A first outside fitting portion 441 is formed such that the inner periphery of the rear side of the protrusion portion is formed like a step around the entire circumference. First outside fitting portion 441 of first spacer 440 is fitted onto the outside of first infrared lens 10 from the front side and is in abutment with the front-side peripheral portion and the outer circumferential surface of first infrared lens 10. Accordingly, first infrared lens 10 is held sandwiched between lock portion 32 of lens holding portion 31 of barrel 430 and first spacer 440.

Vehicle-mounted infrared lens unit 404 in accordance with the fourth embodiment further includes a spacer joint (coupling member) 470 interposed between first spacer 440 and second spacer 447. Spacer joint 470, formed in the shape of a cylinder, has an outer diameter approximately equal to the inner diameter of first spacer 440 and can be inserted from the front side and fitted in first spacer 440. The inner diameter of spacer joint 470 is approximately equal to the outer diameter of second spacer 447, and second spacer 447 can be inserted from the front side and fitted in spacer joint 470. In other words, spacer joint 470 is interposed between first spacer 440 and second spacer 447 with respect to the direction (radial direction) vertical to the axial direction.

On the outer circumferential surface of the front-side end of spacer joint 470, a flange-like lock portion 471 is provided to protrude outward around the entire circumference. On the inner circumferential surface of the rear-side end of spacer joint 470, a lock portion 472 is provided to protrude inward around the entire circumference. When spacer joint 470 is inserted and fitted in first spacer 440, lock portion 471 of spacer joint 470 comes into abutment with the front-side end surface of first spacer 440, whereby lock portion 471 locks the movement of spacer joint 470 toward the back (the rear side) of first spacer 440. When second spacer 447 is inserted and fitted in spacer joint 470, lock portion 472 of spacer joint 470 comes into abutment with the rear-side end surface of second spacer 447, whereby lock portion 472 locks the movement of second spacer 447 toward the back (the rear side) of spacer joint 470.

The axial length of spacer joint 470 is sufficiently shorter than the length of each of first spacer 440 and second spacer 447. In a state in which spacer joint 470 is inserted and fitted in first spacer 440 and second spacer 447 is inserted and fitted in spacer joint 470, a sufficient gap is provided on the front side from the front-side end surface of spacer joint 470, and a sufficient gap is provided on the rear side from the rear-side end surface of spacer joint 470. Spacer joint 470 is formed of a material having a thermal expansion coefficient smaller than that of first spacer 440 and second spacer 447, for example, such as aluminum.

Second spacer 447, formed in the shape of a cylinder, has an outer diameter approximately equal to the inner diameter of spacer joint 470 and can be inserted into spacer joint 470 from the front side to be fitted on the inside of spacer joint 470. At the front-side end of second spacer 447, a protrusion portion is provided in such a manner that the outer circumferential surface is protruded outward around the entire circumference. Second spacer 447 includes a step portion 443 formed such that the rear side of the outer periphery of the protrusion portion is formed like a step around the entire circumference, and a second outside fitting portion formed such that the inner periphery of the front-side end is formed like a step around the entire circumference.

Second outside fitting portion 442 of second spacer 447 is fitted on the outside of the rear side of second infrared lens 20 and is in abutment with the rear-side peripheral portion and the outer circumferential surface of second infrared lens 20. Accordingly, second infrared lens 20 is held sandwiched between second spacer 447 and retaining portion 52 of lens retainer 50.

Second spacer 447 is also fitted on the inside of barrel 430 at step portion 443 and is locked from moving toward the back of barrel 430. In other words, in the protrusion portion provided on the outer circumferential surface of the front-side end of second spacer 447, the smaller outer diameter portion where step portion 443 is provided has an outer diameter approximately equal to the inner diameter of barrel 430 and is fitted on the inside of barrel 430. The larger diameter portion of the protrusion portion of second spacer 447 is in abutment with the front-side end surface of barrel 430 on the rear side where step portion 443 is formed, thereby locking the movement of second spacer 447.

It is noted that first spacer 440 and second spacer 447 are formed of a material having a thermal expansion coefficient greater than those of barrel 430 and spacer joint 470. First spacer 440 and second spacer 447 may be formed of the same material or may be formed of different materials.

In vehicle-mounted infrared lens unit 404 in accordance with the fourth embodiment configured as described above, when the temperature of the surrounding environment rises, second spacer 447 moves spacer joint 470 toward the rear side and moves first spacer 440 toward the rear side by thermal expansion. First spacer 440 presses first infrared lens 10 against the elastic force of O-ring 60 by thermal expansion and moves first infrared lens 10 toward the rear side. Therefore, in vehicle-mounted infrared lens unit 404 in accordance with the fourth embodiment, if the thermal expansion coefficient of spacer joint 470 is sufficiently smaller than those of first spacer 440 and second spacer 470, the amount of movement of first infrared lens 10 by thermal expansion can be almost doubled as compared with when one spacer is used (see the first embodiment). Since first spacer 440 and second spacer 470 can be formed of materials having the respective different thermal expansion coefficients, the amount of movement of first infrared lens 10 as a result of thermal expansion can be adjusted more finely.

Although vehicle-mounted infrared lens unit 404 includes two spacers, first spacer 440 and second spacer 447, in the fourth embodiment, the present invention is not limited thereto and may include three spacers as shown in the following modification or may include four or more spacers. The other configuration of vehicle-mounted infrared lens unit 404 in accordance with the fourth embodiment is similar to the configuration of vehicle-mounted infrared lens unit 4 in accordance with the first embodiment. Therefore, the similar parts are denoted with the same reference numerals and a detailed description thereof will not be repeated.

(Modification)

Figure 20:
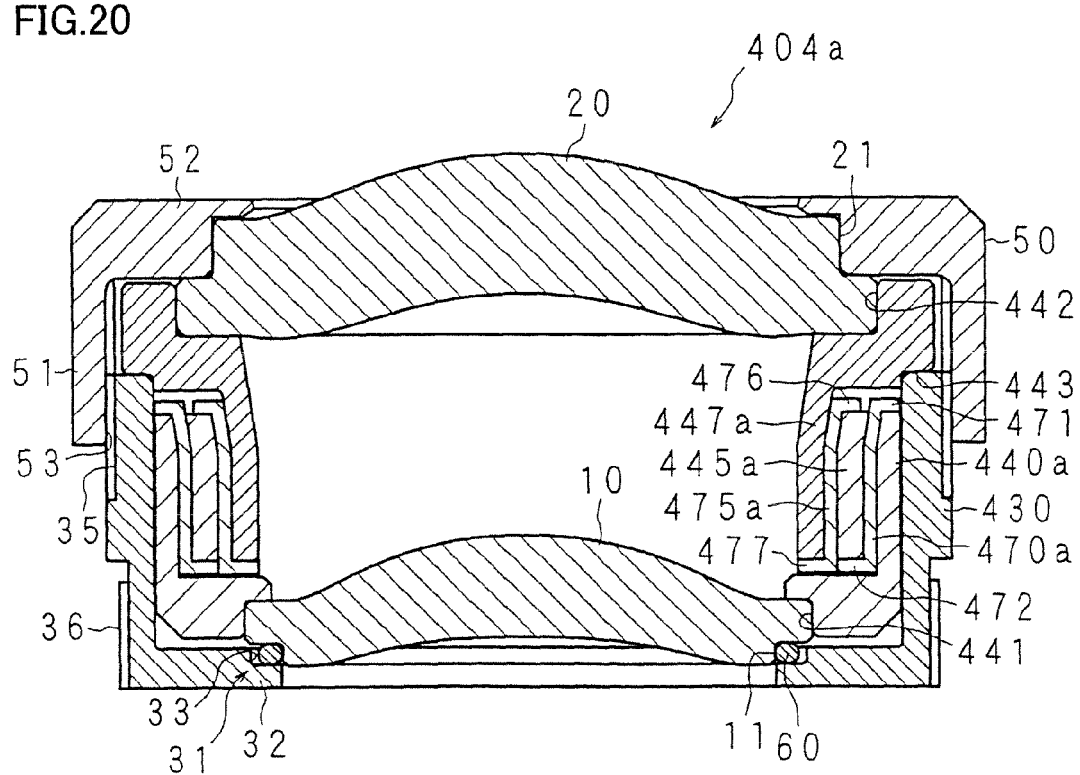
FIG. 20 is a schematic cross-sectional view showing a configuration of the vehicle-mounted infrared lens unit in accordance with a modification of the fourth embodiment of the present invention.

FIG. 20 is a schematic cross-sectional view showing a configuration of a vehicle-mounted infrared lens unit 404a in accordance with a modification of the fourth embodiment of the present invention. Vehicle-mounted infrared lens unit 404a in accordance with the modification includes three spacers, namely, a first spacer 440a, a second spacer 445a, and a third spacer 447a, and two spacer joints interposed therebetween, namely, a first spacer joint 470a and a second spacer joint 475a.

First spacer 440a of vehicle-mounted infrared lens unit 404a in accordance with the modification has almost the same configuration as first spacer 440 in the fourth embodiment shown in FIG. 19. First spacer 440a in the modification is formed in the shape of a cylinder having an outer diameter approximately equal to the inner diameter of barrel 430 and can be fitted on the inside of barrel 430. On the inner circumferential surface of the rear-side end of first spacer 440a, a protrusion portion is provided around the entire circumference. First outside fitting portion 441 is formed at the inner periphery of the rear side of this protrusion portion. First outside fitting portion 441 of first spacer 440a is fitted onto the outside of first infrared lens 10 from the front side, so that first infrared lens 10 is held sandwiched between lock portion 32 of lens holding portion 31 of barrel 430 and first spacer 440a.

First spacer joint 470a, formed in the shape of a cylinder, has an outer diameter approximately equal to the inner diameter of first spacer 440a and can be fitted on the inside of first spacer 440a. The inner diameter of first spacer joint 470a is approximately equal to the outer diameter of second spacer 445a and can be fitted on the outside of second spacer 445a. On the outer circumferential surface of the front-side end of first spacer joint 470a, flange-like lock portion 471 is provided to protrude outward. On the inner circumferential surface of the rear-side end of first spacer joint 470a, lock portion 472 is provided to protrude inward.

When first spacer joint 470a is inserted and fitted in first spacer 440a, lock portion 471 comes into abutment with the front-side end surface of first spacer 440a and locks the movement of first spacer joint 470a toward the back of first spacer 440a. When second spacer 445a is inserted and fitted in first spacer joint 470, lock portion 472 comes into abutment with the rear-side end surface of second spacer 445a and locks the movement of second spacer 445a toward the back of first spacer joint 470a.

Second spacer 445a is formed in the shape of a cylinder having an outer diameter approximately equal to the inner diameter of first spacer joint 470a and having an inner diameter approximately equal to the outer diameter of second spacer joint 475a. Second spacer 445a is fitted on the inside of first spacer joint 470a and is locked from moving toward the rear side by lock portion 472 provided at the rear-side end of first spacer joint 470a. Second spacer 445a is fitted on the outside of second spacer joint 475a and is locked from moving toward the front side by a lock portion 476 of second spacer joint 475a.

Second spacer joint 475a, formed in the shape of a cylinder, has an outer diameter approximately equal to the inner diameter of second spacer 445a and can be fitted on the inside of second spacer 445a. The inner diameter of second spacer joint 475a is approximately equal to the outer diameter of third spacer 447a and can be fitted on the outside of third spacer 447a. On the outer circumferential surface of the front-side end of second spacer joint 475a, flange-like lock portion 476 is provided to protrude outward. On the inner circumferential surface of the rear-side end of second spacer joint 475a, a lock portion 477 is provided to protrude inward.

When second spacer joint 475a is inserted and fitted in second spacer 445a, lock portion 476 comes into abutment with the front-side end surface of second spacer 445a and locks the movement of second spacer joint 475a toward the back of second spacer 445a. When third spacer 447a is inserted and fitted in second spacer joint 475a, lock portion 477 comes into abutment with the rear-side end surface of second spacer 447a and locks the movement of second spacer 447a toward the back of second spacer joint 475a.

Third spacer 447a is formed in the shape of a cylinder having an outer diameter approximately equal to the inner diameter of second spacer joint 475a and can be fitted on the inside of second spacer joint 475a. On the outer circumferential surface of the front-side end of third spacer 447a, a protrusion portion is provided. Third spacer 447a includes a step portion 443 formed such that the rear-side of the outer periphery of this protrusion portion is formed like a step around the entire circumference, and a second outside fitting portion 442 formed such that the inner periphery of the front-side end is formed like a step around the entire circumference.

Second outside fitting portion 442 of third spacer 447a is fitted on the outside of the rear side of second infrared lens 20 and is in abutment with the rear-side peripheral portion and the outer circumferential surface of second infrared lens 20. Accordingly, second infrared lens 20 is held sandwiched between third spacer 447a and retaining portion 52 of lens retainer 50.

Third spacer 447a is fitted on the inside of barrel 430 at step portion 443 and is locked from moving toward the back of barrel 430. In other words, in the protrusion portion provided on the outer circumferential surface of the front-side end of third spacer 447a, the smaller outer diameter portion where step portion 443 is provided has an outer diameter approximately equal to the inner diameter of barrel 430 and is fitted on the inside of barrel 430. The larger outer diameter portion of the protrusion portion of third spacer 447a is in abutment with the front-side end surface of barrel 430 on the rear side where step portion 443 is formed, thereby locking the movement of third spacer 447a.

In summary, in vehicle-mounted infrared lens unit 404a in accordance with the modification, first spacer joint 470a is interposed between first spacer 440a and second spacer 445a, and second spacer joint 475a is interposed between second spacer 445a and third spacer 447a. The movements of first spacer 440a-third spacer 447a are locked by lock portions 471, 472 provided at opposite ends of first spacer joint 470a and lock portions 476, 477 provided at opposite ends of second spacer joint 475a.

In vehicle-mounted infrared lens unit 404a configured as described above, when the temperature of the surrounding environment rises, third spacer 447a moves second spacer joint 475a toward the rear side and moves second spacer 445a toward the rear side by thermal expansion. Second spacer 445a moves first spacer joint 470a toward the rear side and moves first spacer 440a toward the rear side by thermal expansion. Furthermore, first spacer 440a presses first infrared lens 10 against the elastic force of O-ring 60 by thermal expansion and moves first infrared lens 10 toward the rear side. Accordingly, in vehicle-mounted infrared lens unit 404a in accordance with the modification, if the thermal expansion coefficients of first spacer joint 470a and second spacer joint 475a are sufficiently smaller than those of first spacer 440a, second spacer 445a, and third spacer 447a, the amount of movement of first infrared lens 10 by thermal expansion can be almost tripled as compared with when one spacer is used (see the first embodiment).

Figures 21A, 21B:
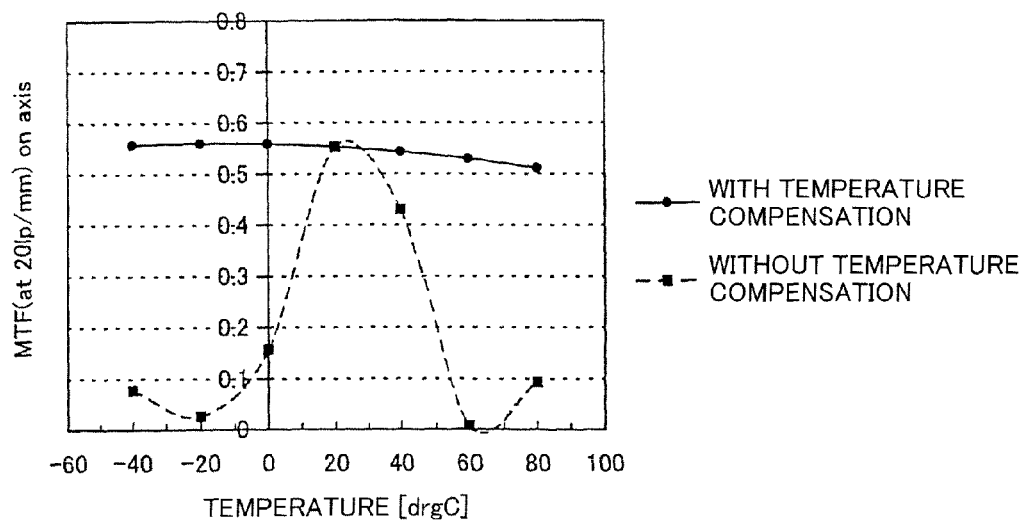
FIG. 21A is a diagram showing a simulation result of the vehicle-mounted infrared lens unit with the layered spacers.
FIG. 21B is a diagram showing a simulation result of the vehicle-mounted infrared lens unit with the layered spacers.

FIG. 21A and FIG. 21B are diagrams showing a simulation result of the vehicle-mounted infrared lens unit with the layered spacers. This simulation result was obtained when the material of first infrared lens 10 and second infrared lens 20 was Ge, the material of barrel 430 was aluminum (coefficient of linear expansion=$21\times10^{-6}$), and first infrared lens 10 was moved by 190 μm in response to a temperature change of 60° C. Furthermore, the spacers were layered using spacer joints as shown in FIG. 19 or FIG. 20, and the materials of the spacers were selected as appropriate such that the coefficient of linear expansion=$650\times10^{-6}$.

According to the simulation result, in the vehicle-mounted infrared lens unit with the layered spacers, the variations of MTF are small for temperature changes of ±60° C., and the values can be kept almost constant. Therefore, it can be understood that vehicle-mounted infrared lens unit 404 (404a) shown in FIG. 19 and FIG. 20 is significantly improved in temperature characteristics of MTF.

Fifth Embodiment

Figure 22:
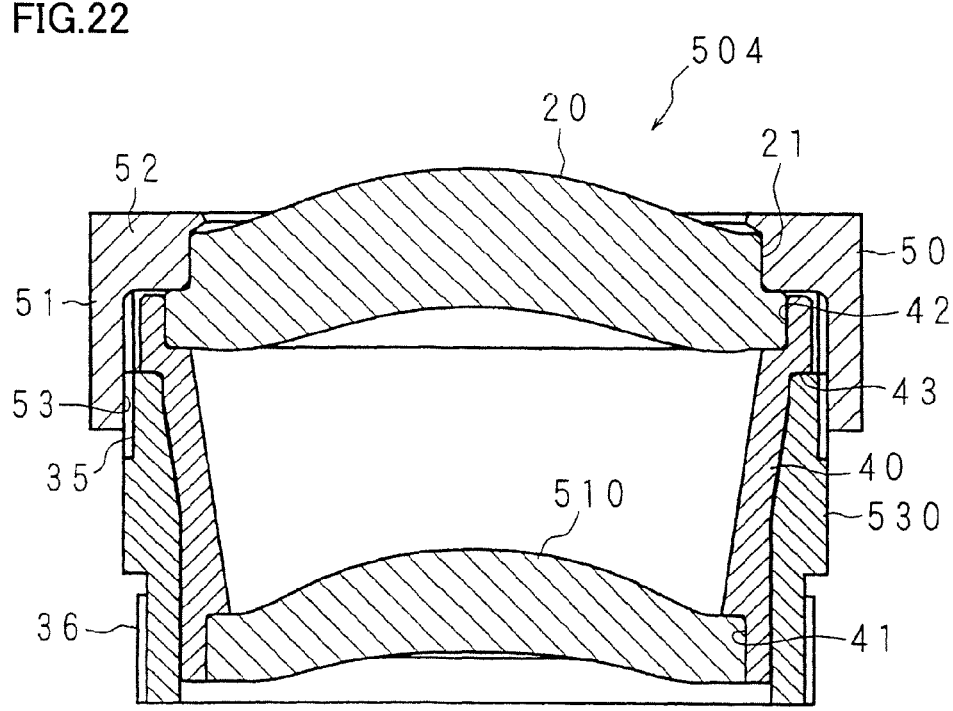
FIG. 22 is a schematic cross-sectional view showing a configuration of the vehicle-mounted infrared lens unit in accordance with a fifth embodiment of the present invention.

FIG. 22 is a schematic cross-sectional view showing a configuration of a vehicle-mounted infrared lens unit 504 in accordance with a fifth embodiment of the present invention. The vehicle-mounted infrared lens unit in accordance with the foregoing first to fourth embodiments is configured such that the barrel has the lens holding portion for holding the infrared lens to be moved with thermal expansion. By contrast, in vehicle-mounted infrared lens unit 504 in accordance with the fifth embodiment, a first infrared lens 510 is adhesively fixed to spacer 40, and a barrel 530 does not have a lens holding portion.

Spacer 40 of vehicle-mounted infrared lens unit 504 in accordance with the fifth embodiment has almost the same configuration as spacer 40 in the first embodiment, wherein first outside fitting portion 41 fitted on the outside of first infrared lens 510 is formed on the inner circumferential surface of the rear-side end, and second outside fitting portion 42 fitted on the outside of second infrared lens 20 is formed on the inner circumferential surface of the front-side end. On the outer circumferential surface of spacer 40, a step portion 43 is formed like a step such that the outer diameter increases stepwise in the vicinity of the front-side end. Then, when spacer 40 is inserted into barrel 530 from the front side, step portion 43 comes into abutment with the front-side end surface of barrel 530 thereby locking the movement of spacer 40 toward the back. First infrared lens 510 is fitted in first outside fitting portion 41 of spacer 40 and fixed using adhesive or the like.

The inner circumferential surface of barrel 530 has a shape corresponding to that portion of the outer circumferential surface of spacer 40 which is closer to the rear side than step portion 43. In other words, the inner circumferential surface of barrel 530 is formed such that the inner diameter is almost constant from the rear-side end to the central portion in the axial direction, and is formed to be tapered such that the diameter increases from the central portion to the front side. The inner diameter of the front-side end of barrel 530 is approximately equal to the smaller outer diameter of the step-like portion formed at step portion 43 of spacer 40. Therefore, spacer 40 inserted from the front side of barrel 530 has step portion 43 coming into abutment with the front-side end surface of barrel 530, whereby further insertion into barrel 530 toward the rear side is locked. In this state, the axial lengths of barrel 530 and spacer 40 are set such that the rear-side end surface of spacer 40 does not protrude from the opening on the rear side of barrel 530 to the outside.

In vehicle-mounted infrared lens unit 504 configured as described above, spacer 40 is formed of a material having a thermal expansion coefficient greater than that of barrel 530. Then, when the temperature of the surrounding environment rises, that portion of spacer 40 which is closer to the rear side than the portion locked to barrel 530 at step portion 43 is elongated in the axial direction by thermal expansion, so that first infrared lens 510 adhesively fixed to outside fitting portion 41 at the rear-side end is moved toward the rear side. Therefore, vehicle-mounted infrared lens unit 504 can correct a focal shift caused by a temperature change of the surrounding environment if the thermal expansion coefficient of spacer 40 is set as appropriate.

The other configuration of vehicle-mounted infrared lens unit 504 in accordance with the fifth embodiment is similar to the configuration of vehicle-mounted infrared lens unit 4 in accordance with the first embodiment. Therefore, the same parts are denoted with the same reference numerals and a detailed description thereof will not be repeated.

(First Modification)

Figure 23:
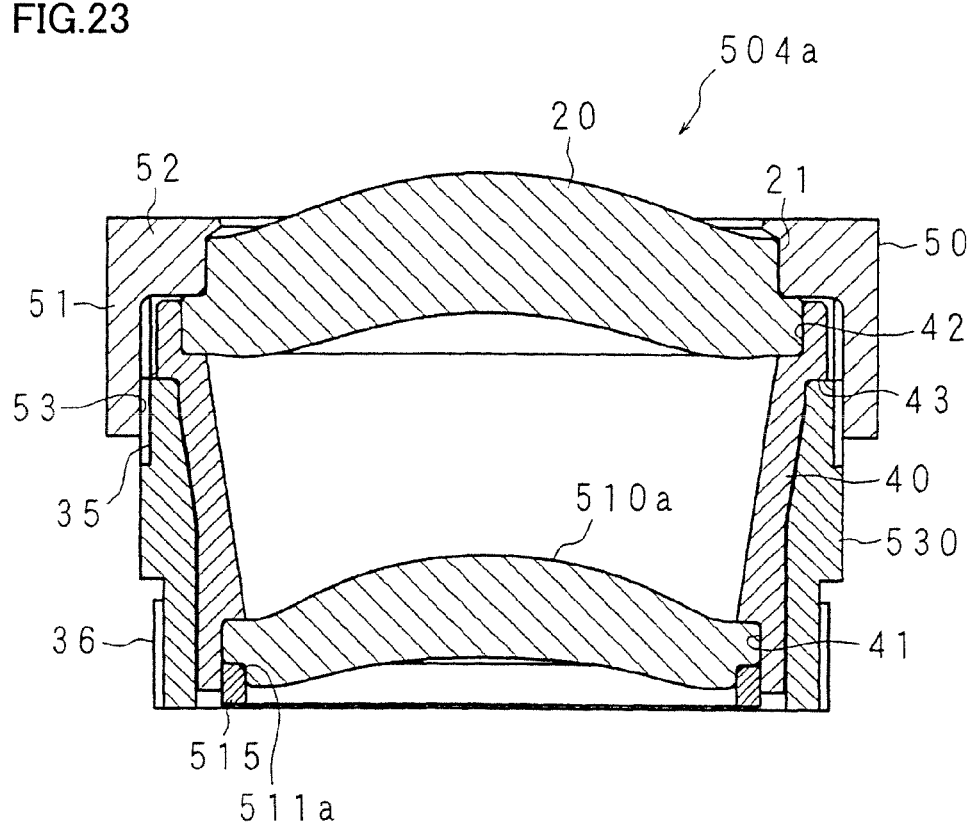
FIG. 23 is a schematic cross-sectional view showing a configuration of the vehicle-mounted infrared lens unit in accordance with a first modification of the fifth embodiment of the present invention.

FIG. 23 is a schematic cross-sectional view showing a configuration of a vehicle-mounted infrared lens unit 504a in accordance with a first modification of the fifth embodiment of the present invention. In vehicle-mounted infrared lens unit 504 in accordance with the foregoing fifth embodiment shown in FIG. 22, first infrared lens 510 is fitted on first outside fitting portion 41 of spacer 40 and adhesively fixed by adhesive or the like. However, the manner of fixing first infrared lens 510 is not limited thereto. In vehicle-mounted infrared lens unit 504a in accordance with the first modification, a first infrared lens 510a is fixed to spacer 40 by a screw member 515.

First infrared lens 510a of vehicle-mounted infrared lens unit 504a in accordance with the first modification has a step portion 511a formed such that the rear-side peripheral portion is depressed like a step around the entire circumference. The depth (the length in the axial direction of first infrared lens 510a) of step portion 511a is about one-third the thickness of the peripheral portion of first infrared lens 510a.

First outside fitting portion 41 of spacer 40 has a thread groove on the inner circumferential surface. Screw member 515 is formed in an annular shape fitted on the outside of step portion 511a of first infrared lens 510a. On the outer circumferential surface of screw member 515, a thread groove is formed which is screwed onto the thread groove formed in first outside fitting portion 41 of spacer 40. In other words, the inner diameter of annular screw member 515 is approximately equal to the diameter of step portion 511a of first infrared lens 510a, and the outer diameter of screw member 515 is approximately equal to the inner diameter of first outside fitting portion 41 of spacer 40.

First infrared lens 510a is fitted in first outside fitting portion 41 of spacer 40, and screw member 515 is thereafter inserted while being rotated into outside fitting portion 41 of spacer 40, whereby spacer 40 and screw member 515 are screwed together. First infrared lens 510a is thus fixed sandwiched between spacer 40 and screw member 515.

(Second Modification)

Figure 24:
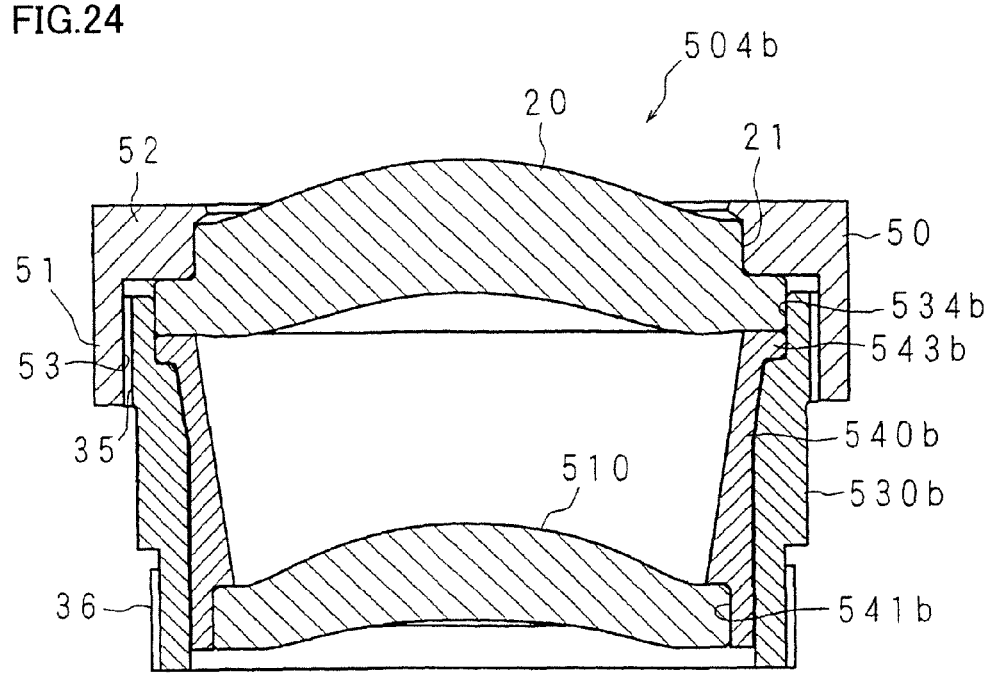
FIG. 24 is a schematic cross-sectional view showing a configuration of the vehicle-mounted infrared lens unit in accordance with a second modification of the fifth embodiment of the present invention.

FIG. 24 is a schematic cross-sectional view showing a configuration of a vehicle-mounted infrared lens unit 504b in accordance with a second modification of the fifth embodiment of the present invention. In vehicle-mounted infrared lens unit 504 in accordance with the foregoing fifth embodiment shown in FIG. 22, second infrared lens 20 is fitted in and adhesively fixed to second outside fitting portion 42 of spacer 40. By contrast, in vehicle-mounted infrared lens unit 504b in accordance with the second modification, second infrared lens 20 is fitted in a step portion 534b provided at the front-side end of a barrel 530b. This configuration is almost the same as the configuration of vehicle-mounted infrared lens unit 4c in accordance with the third modification of the first embodiment shown in FIG. 15.

A spacer 540b of vehicle-mounted infrared lens unit 504b in accordance with the second modification has a flange portion 543b formed around the outer circumferential surface of the front-side end. A barrel 530b has step portion 534b formed like a step around the inner circumferential surface on the front side. The inner diameter of the front-side end of barrel 530b is approximately equal to the outer diameter of that portion of spacer 540b where flange portion 543b is provided and to the outer diameter on the rear side of second infrared lens 20. Spacer 540b inserted from the front side to the inside of barrel 530b has flange portion 543b coming into abutment with step portion 534b of barrel 530b, whereby further insertion toward the rear side is locked. Second infrared lens 20 is fitted in the front-side end of barrel 530b and is in abutment with the front-side end surface of spacer 540b at the rear-side peripheral portion.

At the rear-side end of spacer 540b, an outside fitting portion 541b fitted on the outside of first infrared lens 510 is formed. First infrared lens 510 is fitted in outside fitting portion 541b and thereafter adhesively fixed using adhesive or the like. The inner circumferential surface of barrel 530b has a shape fitted on the outside of spacer 540b such that the inner diameter from the central portion in the axial direction to the rear-side end is formed approximately constant. Spacer 540b inserted from the front side of barrel 530b has flange portion 543b coming into abutment with step portion 534b of barrel 530b, whereby further insertion toward the rear side is locked. In this state, the lengths in the axial direction of barrel 530b and spacer 540b are set such that the rear-side end surface of spacer 540b does not protrude from the opening on the rear side of barrel 530b to the outside.

Vehicle-mounted infrared lens unit 504b in accordance with the second modification configured as described above can correct a focal shift caused by a temperature change of the surrounding environment, if spacer 540b is formed of a material having a thermal expansion coefficient greater than that of barrel 530b, as in vehicle-mounted infrared lens unit 504 in accordance with the fifth embodiment shown in FIG. 22.

(Third Modification)

Figure 25:
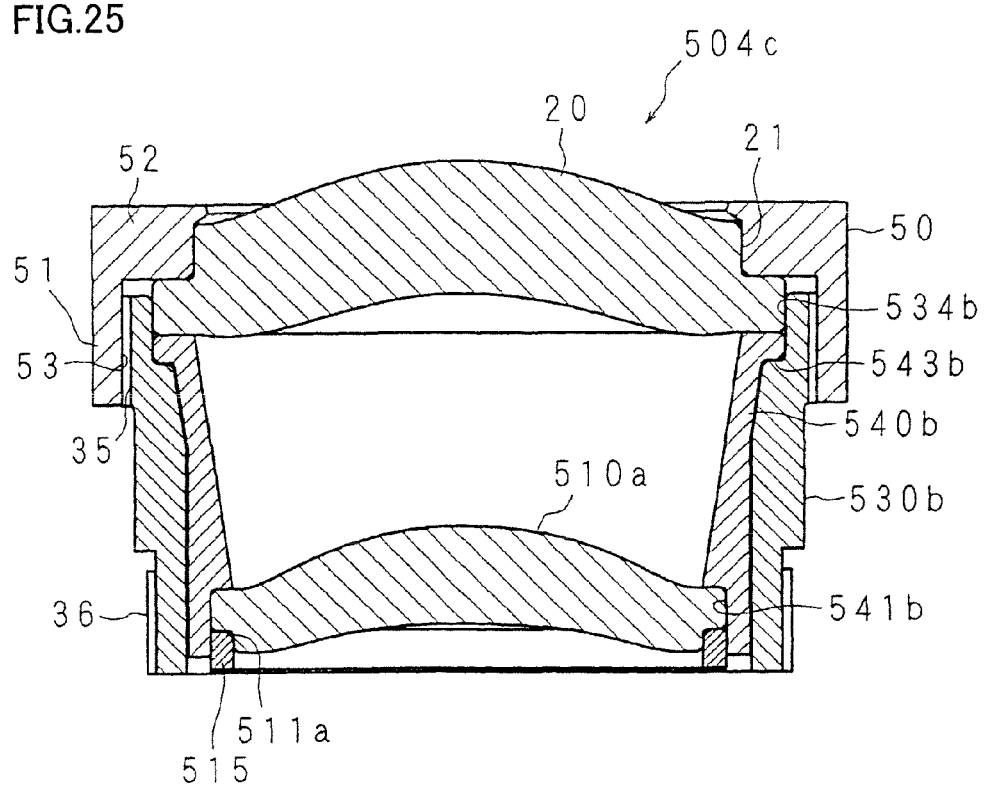
FIG. 25 is a schematic cross-sectional view showing a configuration of the vehicle-mounted infrared lens unit in accordance with a third modification of the fifth embodiment of the present invention.

FIG. 25 is a schematic cross-sectional view showing a configuration of a vehicle-mounted infrared lens unit 504c in accordance with a third modification of the fifth embodiment of the present invention. Vehicle-mounted infrared lens unit 504c in accordance with the third modification is configured such that first infrared lens 510 in vehicle-mounted infrared lens unit 504b in accordance with the second modification shown in FIG. 24 is fixed in a similar manner as in vehicle-mounted infrared lens unit 504a in accordance with the first modification shown in FIG. 23.

In vehicle-mounted infrared lens unit 504c in accordance with the third modification, first infrared lens 510a is fixed to spacer 540b by screw member 515. First infrared lens 510a of vehicle-mounted infrared lens unit 504c in accordance with the third modification has step portion 511a formed such that the rear-side peripheral portion is depressed like a step around the entire circumference. First outside fitting portion 541b of spacer 540b has a thread groove on the inner circumferential surface. Screw member 515 is formed in an annular shape fitted on the outside of step portion 511a of first infrared lens 510a. On the outer circumferential surface of screw member 515, a thread groove is formed which is screwed onto the thread groove formed in outside fitting portion 541b of spacer

540b. Accordingly, spacer 540b and screw member 515 are screwed together, so that first infrared lens 510a can be fixed sandwiched between spacer 540b and screw member 515.

The forgoing first, second, fourth, and fifth embodiments (including the modifications thereof) provide a variety of configurations for holding or fixing the first infrared lens of the vehicle-mounted infrared lens unit and for changing the position of the first infrared lens in response to a temperature change, a variety of configurations for holding or fixing the second infrared lens, and a variety of configurations of the spacer. For example, the designer can select the optimum configuration for the first infrared lens from: being fitted in the outside fitting portion of the spacer; being held sandwiched between the spacer and the lens holding of the barrel; being biased toward the front side by elastic force of the O-ring or the like; being fitted in the step portion formed in the barrel; being in abutment with the tapered surface formed in the barrel; and being directly fixed to the spacer without providing a lens holding portion in the barrel. For example, the optimum configuration for the second infrared lens can be selected from: being fitted in the second fitting portion of the spacer; and being fitted in the step portion formed in the barrel. The optimum configuration for the spacer can be selected from: having a step portion or a flange portion in the vicinity of the front-side end to be engaged with the front-side end surface or the step portion of the barrel; being only sandwiched between the first infrared lens and the second infrared lens without a step portion or a flange; and having a plurality of spacers coupled each other with a spacer joint. Those configurations for the first infrared lens, for the second infrared lens, and for the spacer are not limited to those shown in the first, second, fourth, and fifth embodiments, and any possible configurations can be combined arbitrarily and used.

Sixth Embodiment

In vehicle-mounted infrared lens unit 4 in accordance with the forgoing first embodiment, lens retainer 50 is screwed on barrel 30 to push down second infrared lens 20, spacer 40, and the like for fixing them. Therefore, depending on the material of spacer 40, the pressing force toward the rear side in the axial direction by lens retainer 50 in a high temperature environment may cause creep deformation of spacer 40, so that first infrared lens 10 and second infrared lens 20 may be displaced. Then, in the following sixth embodiment, a configuration capable of preventing deformation of spacer 40 by the pressing force of lens retainer 50 will be described.

Figure 26:
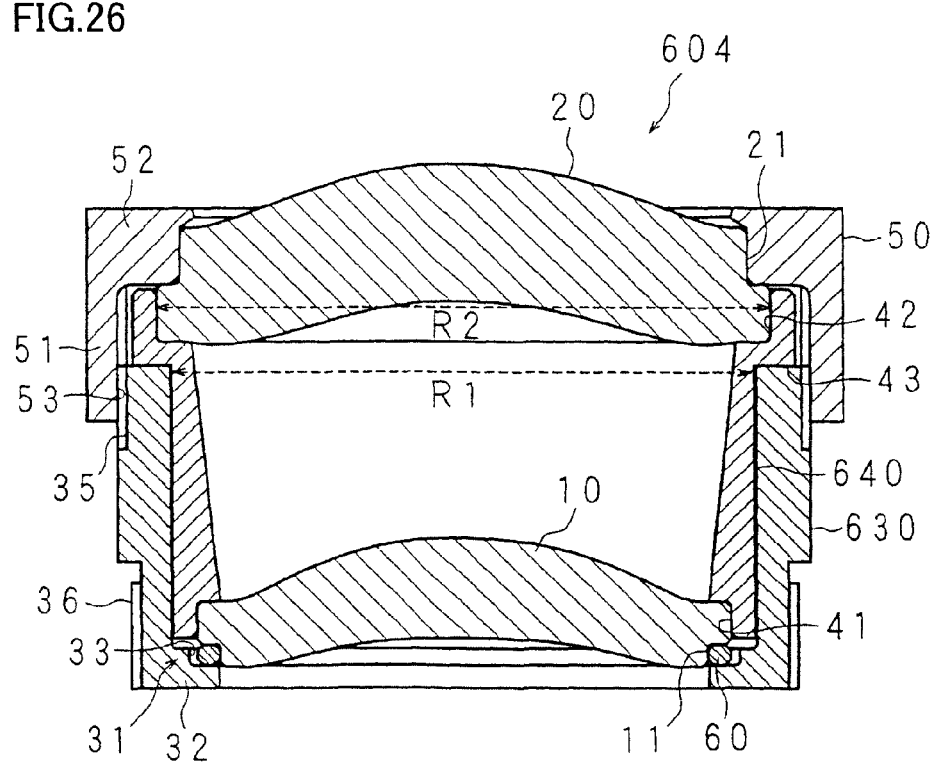
FIG. 26 is a schematic cross-sectional view showing a configuration of the vehicle-mounted infrared lens unit in accordance with a sixth embodiment of the present invention.

FIG. 26 is a schematic cross-sectional view showing a configuration of a vehicle-mounted infrared lens unit 604 in accordance with the sixth embodiment of the present invention. The configuration of vehicle-mounted infrared lens unit 604 in accordance with the sixth embodiment resembles that of vehicle-mounted infrared lens unit 4b in accordance with the second modification of the first embodiment shown in FIG. 10, except for the shapes of a barrel 630 and a spacer 640.

Barrel 630 is formed such that the inner diameter closer to the front side than the portion where lens holding portion 31 is provided is approximately constant. Therefore, the outer diameter of spacer 640 from the rear-side end to where step portion 43 is provided is formed to be approximately constant so as to be approximately equal to the inner diameter of barrel 630. Here, the sizes, shapes, etc. of barrel 630 and spacer 640 are set such that an inner diameter of the front side of barrel 630 (the inner diameter of barrel 630 at a place where it is engaged with step portion 43 to lock spacer 640) R1 is smaller than an outer diameter R2 of second infrared lens 20 (at least the rear side thereof) fitted in second outside fitting portion 42 of spacer 640.

For example, if the inner diameter of barrel 630 at the locking position is larger than the outer diameter of second infrared lens 20 as in vehicle-mounted infrared lens unit 4b shown in FIG. 10, when lens retainer 50 pushes down second infrared lens 20 toward the rear side in the axial direction, the pressing force in the axial direction is only applied to spacer 40. Therefore, the pressing force of lens retainer 50 may deform spacer 40, depending on the material of spacer 40, for example, in a high temperature environment.

By contrast, in vehicle-mounted infrared lens unit 604 in accordance with the sixth embodiment shown in FIG. 26, outer diameter R2 of second infrared lens 20 is larger than inner diameter R1 of the coaxially arranged barrel 630, so that the pressing force applied by lens retainer 50 to second infrared lens 20 in the axial direction is partially or entirely applied to the front-side end surface of barrel 630. This can prevent deformation of spacer 640 (mainly, shear deformation of step portion 43) by the pressing force of lens retainer 50. Barrel 630 can be formed of metal such as aluminum and is less likely to be deformed even in a high temperature environment as compared with spacer 640 formed of, for example, synthetic resin. Based on these, vehicle-mounted infrared lens unit 604 in accordance with the sixth embodiment can effectively prevent displacement of first infrared lens 10 and second infrared lens 20 due to creep deformation by the pressing force of lens retainer 50, thereby achieving improved accuracy and improved reliability.

Now, barrel 630, spacer 640, second infrared lens 20, and the like were formed such that the difference between inner diameter R1 of barrel 630 and outer diameter R2 of second infrared lens 20 was about 0.4 mm, and the resulting vehicle-mounted infrared lens unit 604 was subjected to a test under a high temperature environment load of 100° C. for 300 hours. Then, the displacement in the axial direction of first infrared lens 10 before and after the environment load was less than 5 μm.

The above-noted effect is greater as the difference between inner diameter R1 of barrel 630 and outer diameter R2 of second infrared lens 20 is greater. However, in order to increase the difference between inner diameter R1 of barrel 630 and outer diameter R2 of second infrared lens 20, it is necessary to increase the size of second infrared lens 20 because the size reduction of barrel 630 and spacer 640, etc. is not easy. This leads to a size increase of vehicle-mounted infrared lens unit 604. Therefore, it is preferable to determine inner diameter R1 of barrel 630 and outer diameter R2 of second infrared lens 20, considering, for example, such requirements as accuracy and size for vehicle-mounted infrared lens unit 604 as well as the material used for spacer 640.

In the sixth embodiment, the configuration for preventing deformation of spacer 40 by the pressing force of lens retainer 50 is provided for vehicle-mounted infrared lens unit 4b in accordance with the second modification of the first embodiment shown in FIG. 10. However, the present invention is not limited thereto. The configuration in which the inner diameter of the barrel is made smaller than the outer diameter of the second infrared lens may be adopted as well in the vehicle-mounted infrared lens unit in accordance with any other embodiments and modifications, thereby achieving the effect of preventing displacement of the second infrared lens due to deformation of the spacer.

The invention claimed is:

1. A lens unit comprising a plurality of lenses, a barrel for holding the lenses inside, and a spacer interposed between two said lenses in the barrel, wherein
said barrel or said spacer has a lens holding portion for holding said lens,
said barrel and said spacer are formed of materials having different thermal expansion coefficients,
said spacer is configured to increase a distance between two said lenses by thermal expansion,
said lens holding portion is configured to allow said held lens to move in an axial direction by thermal expansion of said spacer, and
said spacer has an outside fitting portion fitted on an outside of each of two said lenses.

2. The lens unit according to claim 1, wherein
said lens holding portion is provided in said barrel and is configured to hold said lens such that said lens is sandwiched between said lens holding portion and said spacer in the axial direction,
said spacer is configured to press said lens held in said lens holding portion toward said lens holding portion by thermal expansion, and
said lens holding portion is configured to allow said held lens to move in the axial direction by pressing of said spacer.

3. The lens unit according to claim 2, wherein
said lens holding portion has
a lock portion projected on an inner circumferential surface of said barrel for locking movement of said lens and
an elastic member interposed between the lock portion and said lens.

4. The lens unit according to claim 2, wherein
said lens is formed to be tapered such that a peripheral portion thereof on one side in the axial direction has a diameter increasing toward the other side,
said lens holding portion has an abutment portion projected on an inner circumferential surface of said barrel to abut on the peripheral portion on one side of said lens, and
said abutment portion is formed to be tapered at an angle corresponding to that of the peripheral portion of said lens.

5. The lens unit according to claim 1, wherein
said lens holding portion outside of said lens and is configured to hold the lens fitted in the outside fitting portion of said spacer by fixing the lens by fixing means, and
said lens fixed to said outside fitting portion is moved in the axial direction by thermal expansion of said spacer.

6. The lens unit according to claim 5, further comprising lock means for locking movement of said spacer in the axial direction relative to said barrel, wherein
said spacer is configured to allow said lens held in said lens holding portion to move in the axial direction by thermal expansion of a portion from a lock position achieved by said lock means to said lens holding portion.

7. The lens unit according to claim 6, further comprising a lens retainer fixed to said barrel and abutting on a lens arranged on an outermost side in the axial direction, for pushing the lens to said spacer, wherein
an inner diameter of said barrel at the lock position achieved by said lock means is smaller than an outer diameter of the lens pushed down by said lens retainer.

8. The lens unit according to claim 7, wherein
a plurality of spacers are arranged between two said lenses, the lens unit further comprises a coupling member arranged between two spacers so as to be fitted on an inside of one spacer to lock an end portion of the spacer and to be fitted on an outside of another spacer to lock an end portion of the spacer, and
a thermal expansion coefficient of the coupling member is smaller than a thermal expansion coefficient of said spacers.

9. The lens unit according to claim 7 or 8, wherein a thermal expansion coefficient of said spacer is greater than a thermal expansion coefficient of said barrel.

10. A lens unit comprising a lens and a barrel for holding the lens inside,
said lens being formed to be tapered such that a peripheral portion thereof on one side in an axial direction has a diameter increasing toward the other side, further comprising
an abutment portion projected on an inner circumferential surface of said barrel to abut on the peripheral portion on one side of said lens, and
a pressing member in abutment with a peripheral portion on the other side of said lens for pressing said lens toward the one side,
wherein said abutment portion is formed to be tapered at an angle corresponding to that of the peripheral portion of said lens.

11. The lens unit according to claim 1 or 10, wherein a thermal expansion coefficient of said barrel is greater than a thermal expansion coefficient of said lens.

12. A vehicle-mounted infrared lens unit included in an infrared imaging apparatus mounted on a vehicle, said vehicle-mounted infrared lens unit including a plurality of infrared lenses, a barrel for holding the infrared lenses inside, and a spacer interposed between two said infrared lenses in the barrel, wherein
said barrel or said spacer has a lens holding portion for holding said infrared lens,
said barrel and said spacer are formed of materials having different thermal expansion coefficients,
said spacer is configured to increase a distance between two said infrared lenses by thermal expansion,
said lens holding portion is configured to allow said held infrared lens to move in an axial direction by thermal expansion of said spacer, and
said spacer has an outside fitting portion fitted on an outside of each of two said infrared lenses.

13. A vehicle-mounted infrared lens unit included in an infrared imaging apparatus mounted on a vehicle, said vehicle-mounted infrared lens unit comprising an infrared lens and a barrel for holding the infrared lens inside,
said infrared lens being formed to be tapered such that a peripheral portion thereof on one side in an axial direction has a diameter increasing toward the other side, further comprising
an abutment portion projected on an inner circumferential surface of said barrel to abut on the peripheral portion on one side of said infrared lens and
a pressing member in abutment with a peripheral portion on the other side of said infrared lens for pressing said infrared lens toward the one side, wherein
said abutment portion is formed to be tapered at an angle corresponding to that of the peripheral portion of said infrared lens.

* * * * *

UNITED STATES PATENT AND TRADEMARK OFFICE
CERTIFICATE OF CORRECTION

PATENT NO. : 8,456,769 B2
APPLICATION NO. : 13/131812
DATED : June 4, 2013
INVENTOR(S) : Kanji Teraoka et al.

It is certified that error appears in the above-identified patent and that said Letters Patent is hereby corrected as shown below:

IN THE CLAIMS:

Column 37, Claim Number 5, Line Number 44, delete the phrase "outside of said lens and"

Signed and Sealed this
First Day of April, 2014

Michelle K. Lee
*Deputy Director of the United States Patent and Trademark Office*